United States Patent
Lin

(10) Patent No.: US 12,512,927 B2
(45) Date of Patent: Dec. 30, 2025

(54) OPERATION METHOD FOR AN ELECTRONIC DEVICE AND AN ELECTRONIC DEVICE CAPABLE OF PERFORMING AN ADVANCED LINE CODING

(71) Applicant: SK hynix Inc., Icheon-si (KR)

(72) Inventor: Wen Jyh Lin, Zhubei (TW)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/504,650

(22) Filed: Nov. 8, 2023

(65) Prior Publication Data

US 2024/0163010 A1    May 16, 2024

Related U.S. Application Data

(60) Provisional application No. 63/425,200, filed on Nov. 14, 2022.

(30) Foreign Application Priority Data

Oct. 11, 2023    (TW) .................................. 112138718

(51) Int. Cl.
*H04L 1/00* (2006.01)
*H04L 25/49* (2006.01)

(52) U.S. Cl.
CPC .......... *H04L 1/0046* (2013.01); *H04L 1/0072* (2013.01); *H04L 25/4908* (2013.01)

(58) Field of Classification Search
CPC ........................... H04L 1/0072; H04L 25/4908
See application file for complete search history.

(56) References Cited

U.S. PATENT DOCUMENTS

| | | | |
|---|---|---|---|
| 5,579,476 A | 11/1996 | Cheng et al. | |
| 6,415,313 B1 | 7/2002 | Yamada et al. | |
| 6,880,111 B2 * | 4/2005 | Fanning | H04L 1/16 714/39 |
| 7,376,917 B1 | 5/2008 | Lazarut et al. | |
| 8,644,148 B2 | 2/2014 | Balandin et al. | |
| 8,830,877 B2 | 9/2014 | Jin et al. | |
| 9,622,111 B2 | 4/2017 | Park | |
| 9,727,501 B2 | 8/2017 | Gowravaram et al. | |

(Continued)

FOREIGN PATENT DOCUMENTS

| | | |
|---|---|---|
| KR | 1020140091719 A | 7/2014 |
| WO | 2022078426 A1 | 4/2022 |

*Primary Examiner* — Guerrier Merant
*Assistant Examiner* — Jack Kensington Barnett
(74) *Attorney, Agent, or Firm* — WILLIAM PARK AND ASSOCIATES LTD.

(57) ABSTRACT

Electronic device and operation method for an electronic device are provided. In the electronic device, a plurality of protocol data unit (PDU) blocks is generated to be transmitted on one or more lanes of a link. An advanced line encoding (ALE) frame is further generated based on an ALE scheme. The ALE scheme has an effective data rate larger than an effective data rate of 8b/10b coding scheme, and the ALE frame includes the plurality of PDU blocks, an error detection portion corresponding to the plurality of PDU blocks, and an error correction portion corresponding to the plurality of PDU blocks and the error detection portion. The ALE frame is transmitted on the one or more lanes of the link to another electronic device.

24 Claims, 24 Drawing Sheets

(56) References Cited

U.S. PATENT DOCUMENTS

| | | |
|---|---|---|
| 9,998,890 B2 | 6/2018 | Marko |
| 10,039,099 B2 | 7/2018 | Sato et al. |
| 10,075,566 B2 | 9/2018 | Lee et al. |
| 10,154,402 B2 | 12/2018 | Agiwal et al. |
| 10,254,972 B2 | 4/2019 | Iwai et al. |
| 10,534,034 B2 | 1/2020 | Froelich et al. |
| 10,587,362 B2 | 3/2020 | Rico Alvarino et al. |
| 10,606,710 B2 | 3/2020 | Kim et al. |
| 10,630,410 B2 | 4/2020 | Parkvall et al. |
| 10,686,472 B2 | 6/2020 | Hosseini et al. |
| 10,700,810 B2 | 6/2020 | Pandey |
| 10,812,229 B2 | 10/2020 | Han et al. |
| 10,834,661 B2 | 11/2020 | Joseph et al. |
| 10,873,429 B1 | 12/2020 | Kwon et al. |
| 11,070,259 B2 | 7/2021 | Manolakos et al. |
| 11,336,445 B2 | 5/2022 | Anslot et al. |
| 11,419,004 B2 | 8/2022 | Ramos |
| 11,444,721 B2 | 9/2022 | Li et al. |
| 11,546,087 B2 | 1/2023 | Jeong et al. |
| 11,687,420 B2 | 6/2023 | Lin et al. |
| 11,722,469 B2 | 8/2023 | Kravitz et al. |
| 11,770,844 B2 | 9/2023 | Zhou et al. |
| 11,847,459 B2 | 12/2023 | Agarwal et al. |
| 11,943,053 B2 | 3/2024 | Chen et al. |
| 12,237,919 B2 | 2/2025 | Zheng et al. |
| 12,356,201 B2 | 7/2025 | Wei et al. |
| 12,363,043 B2 | 7/2025 | Mate et al. |
| 12,396,023 B2 | 8/2025 | Yi et al. |
| 12,414,172 B2 | 9/2025 | Gupta |
| 2008/0285678 A1 | 11/2008 | Karaki |
| 2010/0165896 A1 | 7/2010 | Gong et al. |
| 2011/0066921 A1 | 3/2011 | Blackmon et al. |
| 2011/0076953 A1 | 3/2011 | Macrae |
| 2012/0120960 A1 | 5/2012 | Nishioka |
| 2013/0061099 A1 | 3/2013 | Radulescu |
| 2013/0179628 A1 | 7/2013 | Sekiya |
| 2013/0227509 A1 | 8/2013 | Chang et al. |
| 2016/0246667 A1 | 8/2016 | Kumar Rao |
| 2016/0364309 A1 | 12/2016 | Park et al. |
| 2017/0093521 A1 | 3/2017 | Wang et al. |
| 2017/0220517 A1 | 8/2017 | Khan et al. |
| 2017/0286357 A1 | 10/2017 | Chellappan et al. |
| 2018/0132263 A1 | 5/2018 | Nuggehalli et al. |
| 2019/0052736 A1 | 2/2019 | Turtinen et al. |
| 2019/0182809 A1 | 6/2019 | Liu et al. |
| 2019/0191330 A1 | 6/2019 | Dao et al. |
| 2020/0081646 A1 | 3/2020 | Byun et al. |
| 2020/0082891 A1 | 3/2020 | Lee et al. |
| 2020/0192856 A1 | 6/2020 | Lee et al. |
| 2020/0356519 A1 | 11/2020 | Ballantyne et al. |
| 2020/0379833 A1 | 12/2020 | Hsiao et al. |
| 2022/0294476 A1 | 9/2022 | Seol et al. |
| 2023/0056001 A1 | 2/2023 | Lin |
| 2023/0133677 A1 | 5/2023 | Sun et al. |
| 2023/0188256 A1 | 6/2023 | Yu et al. |
| 2023/0239073 A1 | 7/2023 | Bharadwaj et al. |
| 2023/0269311 A1 | 8/2023 | Liu |
| 2023/0377618 A1 | 11/2023 | Lin |
| 2023/0396360 A1* | 12/2023 | Zhang ............... H04L 1/0011 |
| 2024/0014943 A1* | 1/2024 | Kuo ................... H04L 1/1822 |
| 2024/0089236 A1 | 3/2024 | Li et al. |
| 2024/0121326 A1* | 4/2024 | Lin ..................... H04L 69/08 |
| 2024/0340322 A1 | 10/2024 | Bouazizi et al. |
| 2024/0397399 A1* | 11/2024 | Gupta ............... H04W 36/322 |
| 2025/0047400 A1 | 2/2025 | Peyla et al. |
| 2025/0097954 A1 | 3/2025 | Sengupta et al. |
| 2025/0142440 A1 | 5/2025 | Lee et al. |
| 2025/0158765 A1 | 5/2025 | Echigo et al. |

* cited by examiner

OPERATION METHOD FOR AN ELECTRONIC DEVICE AND AN ELECTRONIC DEVICE CAPABLE OF PERFORMING AN ADVANCED LINE CODING

CROSS-REFERENCE TO RELATED APPLICATION

This non-provisional application claims priority under 35 U.S.C. § 119(e) on U.S. provisional Patent Application No. 63/425,200 filed on Nov. 14, 2022, and claims priority under 35 U.S.C. § 119(a) to Taiwanese Patent Application No. 112138718 filed on Oct. 11, 2023, in the Taiwan Intellectual Property Office, the entire contents of which are hereby incorporated by reference.

BACKGROUND OF THE INVENTION

1. Field of the Invention

The present disclosure relates to an electronic device and a method therefor, and in particular to methods for an interconnection protocol with an advanced line encoding, a controller therefor, and an electronic device such as a host device and a storage device thereof.

2. Description of the Related Art

The Mobile Industry Processor Interface (MIPI) alliance developed interconnection protocol technology, for example, MIPI M-PHY specification associated with a physical layer and MIPI UniPro specification associated with a Unified Protocol (UniPro), for interconnection from one chip to another inside the mobile devices or those affected by the mobile devices in order to implement higher transmission speeds and low power consumption operations. On the other hand, the Joint Electron Device Engineering Council (JEDEC), using the MIPI M-PHY specification and the MIPI UniPro specification, launched a high-performance non-volatile memory standard that is referred to as Universal Flash Storage (UFS). The UFS standard realizes gigabit-level high-speed transmissions and low-power operations, and provides the functionality and expandability required for advanced mobile systems (for example, computing devices such as smartphones, tablet computers, multimedia devices, and wearable devices) to facilitate rapid adoption by the industry.

A system implemented according to the UFS standard includes a local host and a remote device, wherein the local host may be a computing device and the remote device may be a storage device implemented by a non-volatile memory, for example. A bidirectional link is established between the host and the device, and this link in between can be configured with multiple lanes in either of the transmission directions. Each of the host and the device can be implemented with a physical interface according to the M-PHY specification and a link controller according to the UniPro specification.

For all M-PHY symbols transmitted over the link, the physical interface is required to apply a specified line coding (or symbol coding) technique referred to as "8b10b" or "8b/10b" coding defined in the M-PHY specification for DC balance. The link controller also utilizes the symbol encoding technique that UniPro requires for M-PHY correspondingly. In this well-known 8b10b coding scheme, every byte is converted to ten bits and the 8b10b coding has 20% overhead accordingly.

BRIEF SUMMARY OF THE INVENTION

In the present disclosure, technologies for facilitating an interconnection protocol capable of performing an advanced line encoding scheme to improve an effective data rate are provided, and are suitable for an electronic device capable of linking to another electronic device based on the interconnection protocol.

Embodiments of an operation method for an electronic device are provided. The electronic device is operable to communicate with another electronic device. The operation method comprises the following operations. By a controller of the electronic device, a plurality of protocol data unit (PDU) blocks to be transmitted on one or more lanes of a link is generated. By the controller, an advanced line encoding (ALE) frame is generated based on an ALE scheme, wherein the ALE scheme has an effective data rate larger than an effective data rate of 8b/10b coding scheme, and the ALE frame includes the plurality of PDU blocks, an error detection portion corresponding to the plurality of PDU blocks, and an error correction portion corresponding to the plurality of PDU blocks and the error detection portion. By the electronic device, the ALE frame is transmitted on the one or more lanes of the link to another electronic device.

Embodiments of an electronic device are provided. The electronic device is operable to communicate with another electronic device. The electronic device comprises a controller and an interface circuit. The controller is capable of generating a plurality of protocol data unit (PDU) blocks to be transmitted on one or more lanes of a link. The controller is further capable of generating an advanced line encoding (ALE) frame based on an ALE scheme. The ALE scheme has an effective data rate larger than an effective data rate of 8b/10b coding scheme, and the ALE frame includes the plurality of PDU blocks, an error detection portion corresponding to the plurality of PDU blocks, and an error correction portion corresponding to the plurality of PDU blocks and the error detection portion. The interface circuit is capable of transmitting the ALE frame on the one or more lanes of the link to another electronic device.

In some embodiments of the operation method or the electronic device, the plurality of PDU blocks each includes respective symbols that may be obtained from PDUs from either a data link layer or a physical adapter layer of the electronic device.

In some embodiments of the operation method or the electronic device, the plurality of PDU blocks includes a control block, and a specific number of protocol data units (PDUs) are received as a PDU block to be transmitted on the one or more lanes of the link, wherein the PDU block includes at least one PDU belonging to a control PDU category. By the controller, the control block is generated based on the PDU block by reordering the PDUs of the PDU block, wherein the control block includes a type indicator indicating a control block category; the PDUs of the PDU block are reordered such that in the control block, any PDU belonging to the control PDU category in the PDU block is placed before any PDU belonging to a data PDU category in the PDU block.

In some embodiments of the operation method or the electronic device, the PDU block has a PDU belonging to the control PDU category obtained by conversion of a control symbol from the data link layer of the electronic device.

In some embodiments of the operation method or the electronic device, the control symbol from the data link layer of the electronic device is a data link layer control symbol based on a Unified Protocol (UniPro).

In some embodiments of the operation method or the electronic device, the PDU block has a PDU belonging to the control PDU category obtained by conversion of a control symbol of the physical adapter layer of the electronic device.

In some embodiments of the operation method or the electronic device, the control symbol of the physical adapter layer of the electronic device is a physical adapter control protocol (PACP) control symbol based on a Unified Protocol (UniPro).

In some embodiments of the operation method or the electronic device, a PDU belonging to the control PDU category in the PDU block includes a position field indicating a position of the PDU in the PDU block.

In some embodiments of the operation method or the electronic device, a first PDU belonging to the control PDU category in the PDU block includes a link list field indicating whether there is a second PDU belonging to the control PDU category in the PDU block and being placed after the first PDU in the control block.

In some embodiments of the operation method or the electronic device, the plurality of PDU blocks includes a data block, and the controller is capable of receiving a specific number of another PDUs as another PDU block to be transmitted on the one or more lanes of the link, and the controller is capable of generating the data block based on the other PDU block, wherein all PDUs of the another PDU block belong to the data PDU category, the data block includes a type indicator and all PDUs of the other PDU block, and the type indicator of the data block indicates a data block category.

In some embodiments of the operation method or the electronic device, the controller is capable of distributing the ALE frame on the one or more lanes of the link in one of byte-based distribution and PDU-based distribution selectively based on an active lane number.

In some embodiments of the operation method or the electronic device, the controller is capable of transmitting at least one ordered set to the other electronic device to initiate a burst, wherein the controller transmits the control block after initiating the burst.

DETAILED DESCRIPTION OF THE INVENTION

Figure 1:
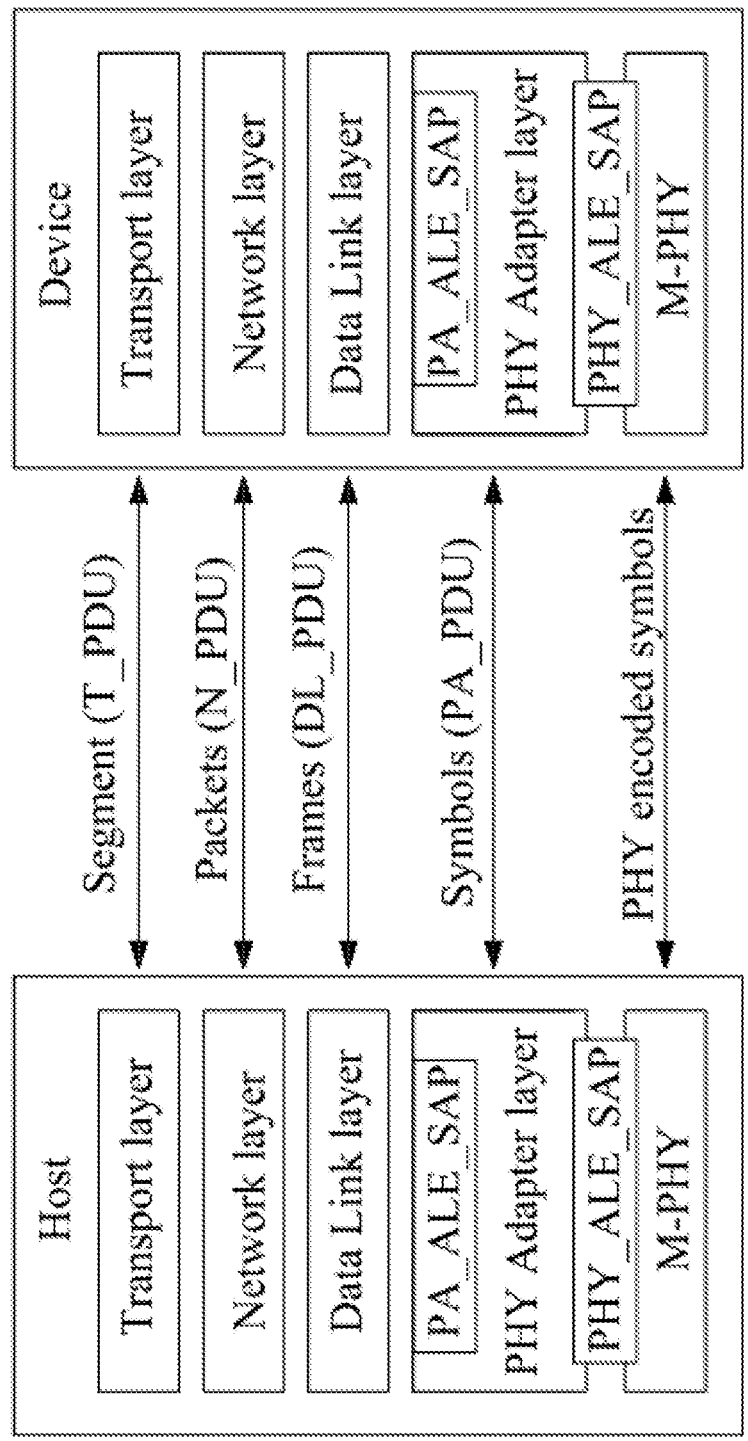
FIG. 1 is a schematic diagram illustrating new service access points (SAPs) in a UFS system to implement advanced line encoding (ALE) according to an embodiment of the present disclosure.

To facilitate understanding of the object, characteristics and effects of this present disclosure, embodiments together with the attached drawings for the detailed description of the present disclosure are provided.

In the present disclosure, embodiments of an interconnection protocol with an advanced line coding scheme are provided. The advanced line coding scheme hereafter is referred to as Advance Line Encode or advanced line encoding (ALE) which indicates a coding scheme having an effective data rate larger than an effective data rate of 8b/10b coding scheme. In addition, embodiments of a new frame structure for an advanced line encoding (ALE) scheme, referred to as an ALE frame, for the interconnection protocol are provided to conduct or realize the advanced line encoding (ALE) for improved data throughput. In addition, a forward error correction (FEC) scheme can be adopted in the ALE frame for implementations of the interconnection protocol in conjunction with an advanced signaling scheme such as a pulse amplitude modulation with n levels (PAM-n) signaling (where n>2). With that, embodiments of FEC framing are provided also.

The interconnection protocol can be derived from the UFS standard. The interconnection protocol can also be regarded as a proposed or enhanced version of the UFS standard in the future. The advanced line coding can be implemented in the interconnection protocol as an advanced operation mode, or referred to as an advanced line encoding (ALE) mode, which indicates that an electronic device compliant with the interconnection protocol operating in this mode is capable of data transmission by using an ALE scheme.

In some embodiments, an advanced signaling scheme for bits transmission different from conventional signaling schemes, such as Non-Return-to-Zero (NRZ) or Pulse Width Modulation (PWM), available in the current UFS standard, may be further adopted in conjunction with the ALE scheme to enhance overall data throughput. For example, signaling schemes for bits transmission such as a pulse amplitude modulation with n level (PAM-n, where n>2) can be adopted together with the ALE scheme, wherein n is an integer such as 3, 4, 5, 6, 8, or 16.

Various embodiments are provided below for facilitating the interconnection protocol with the ALE, and are suitable for a first electronic device capable of communicating with a second electronic device based on the interconnection protocol.

As mentioned above, the interconnection protocol with the ALE can be derived from the UFS standard. For example, a conventional UFS system includes a UFS host and a UFS device. The UFS host and the UFS device communicate each other through respective UFS Interconnect (UIC) layer including UniPro and M-PHY. Accordingly, the interconnection protocol with the ALE can be implemented and derived from architecture of the conventional UFS system by using a modified UFS system implementing a modified version of UniPro and a modified version of M-PHY for the ALE. Further, the interconnection protocol with the ALE can also be implemented in a communication system including a host and a device each having respective link layer (such as a modified version of UniPro) and respective physical layer (such as a modified version of M-PHY) both compliant with the ALE.

Referring to FIG. 1, service access points (SAPs) in a modified UFS system are illustrated to implement an advanced line encoding (ALE) according to an embodiment of the present disclosure. In this embodiment as shown in FIG. 1, either the host or device of the modified UFS system has new service access points (SAPs) associated with the facilitation of ALE in the protocol stack. For example, a PHY Adapter (PA) service access point for ALE, denoted by PA_ALE_SAP, provides services in the PA layer for data transfer for ALE. In addition, a service access point for PHY layer (e.g., M-PHY) with ALE, denoted by PHY_ALE_SAP, provides services in the PA layer for association of the PA layer with PHY layer.

As illustrated in FIG. 1, on one side (e.g., a host) of the communication system, the layers of the UniPro, such as the transport layer to PA layer, and the PHY layer communicate with their counterparts on the peer side (e.g., a device) by using their respective protocol data units (e.g., segments (T_PDU), packets (N_PDU), frames (DL_PDU), symbols (PA_PDU), and PHY encoded symbols), wherein the PA layer and PHY layer are configured to support the ALE. To implement an advanced line encoding, one or more blocks are generated in the PA layer for transmission to a peer side, wherein each block includes a plurality of symbols or protocol data units (PDUs) from the DL or PA layer. In this regard, the SAPs for data transfer or related operations in the advanced line encoding mode are provided in the modified UFS system.

Figure 2:
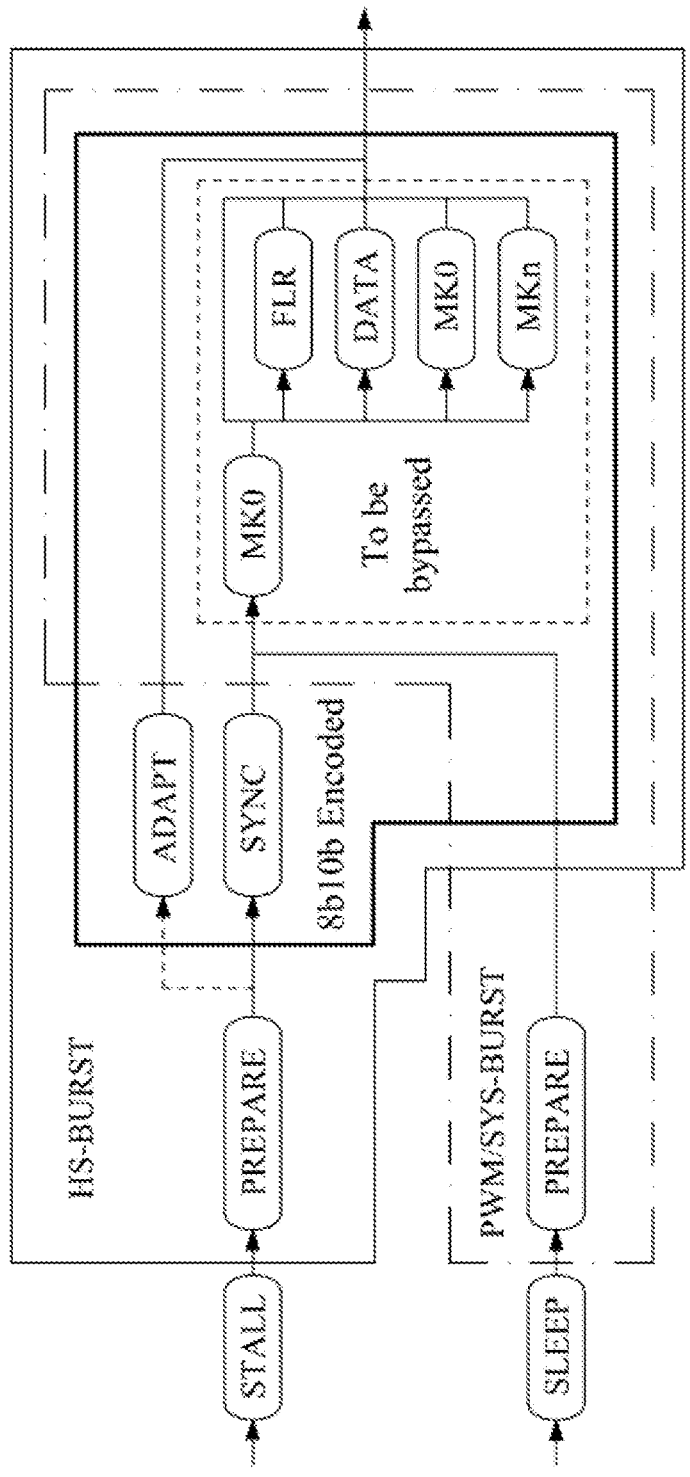
FIG. 2 is a schematic diagram illustrating modifications to M-PHY to facilitate data transmission using ALE according to an embodiment of the present disclosure.

In addition, FIG. 2 illustrates modifications to M-PHY to facilitate data transmission using ALE according to an embodiment of the present disclosure. Referring to FIG. 2, it is assumed that 8b/10b coding in M-PHY can be bypassed in a physical layer for the ALE derived from the current M-PHY, wherein the physical layer for the ALE is referred to as a modified physical layer or a modified M-PHY. In some embodiments, the modified physical layer is implemented as an interface circuit to perform bits transmission of the "blocks" as mentioned above coming from the modified PA layer in the advanced line encoding mode in which 8b/10b coding is bypassed. In this manner, the modified physical layer in the advanced line encoding mode can be configured to perform bits transmission for the blocks and the advanced line encoding in which the blocks are encoded is performed in the modified PA layer. This approach leads to flexibility of implementation of the PA layer and the physical layer of the interconnection protocol in terms of line coding scheme. For example, the modified M-PHY may be implemented to perform bits transmission in the advanced line encoding mode in addition to bits transmission for conventional 8b/10b encoding or implemented to be dedicated for the ALE instead of 8b/10b encoding. For example, the modified M-PHY may be implemented to perform bits transmission using a specific signaling scheme, such as PAM-n (where n>2, e.g., PAM-4), which can be utilized in the advanced line encoding mode. In addition, in an implementation of the modified M-PHY, the interface between the modified PA layer and the modified physical layer may be a signaling interface for an advanced line encoding with a larger bus width, e.g., a bus width of 80 bits, 128 bits, 160 bits or more, for example, based on Reference M-PHY MODULE Interface (RMMI). On the other hand, FIG. 2 illustrates a BURST sub-state machine specified by M-PHY specification (such as version 5.0), wherein the terms such as STALL, PREPARE, ADAPT, SYNC, SLEEP, PREPARE, HS-BURST, PWM/SYS BURST, and so on are defined by the M-PHY specification, which one of ordinary skill in the art would understand accordingly, and for the sake of brevity, their details will not be repeated herein. It is also noted that the BURST sub-state machine is shown for the sake of illustration and the implementation of the modified M-PHY is not limited to the above examples.

Figure 3:
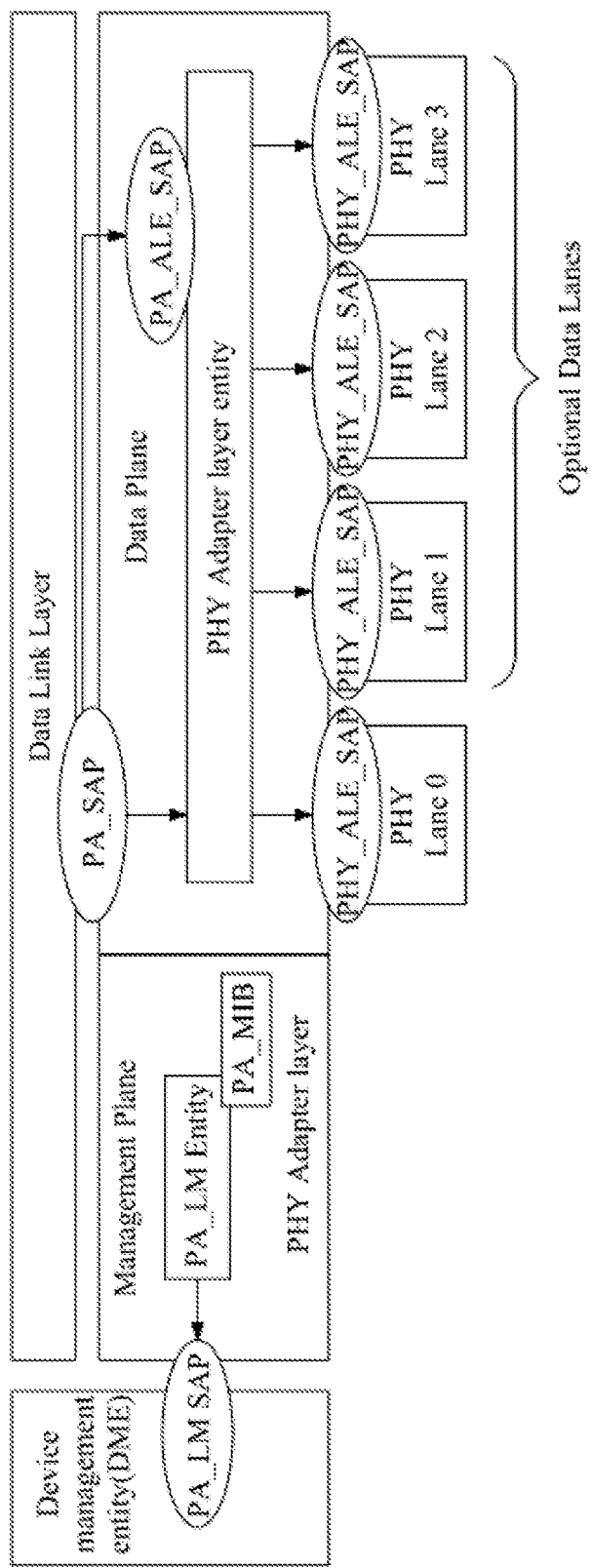
FIG. 3 is a schematic diagram of an embodiment of PHY adapter layer SAP model for ALE operations.

FIG. 3 illustrates an embodiment of PHY adapter layer SAP model for ALE operations in a schematic diagram. A modified PHY adapter (PA) layer illustrated in FIG. 3 for ALE can be derived from the PHY Adapter Layer SAP model of UniPro version 2.0. As shown in FIG. 3, a data link layer, a PHY Adapter layer, and a device management entity (DME) can be derived from the PHY Adapter Layer SAP model of UniPro version 2.0. The PHY Adapter layer, for example, includes PA_SAP and PHY Adapter layer entity in data plane; and PA layer management (PA_LM) entity, PA Layer-specific Management Information Base (PA_MIB), and PA layer management service access point (PA_LM SAP) in management plane. As compared to the PA layer of UniPro version 2.0, the modified PA layer has the PHY Adapter (PA) service access point for ALE (PA_ALE_SAP) in the modified PA layer to provide services in the modified PA layer, especially for the PHY Adapter service access point (PA_SAP). In addition, the service access point for PHY layer with ALE (PHY_ALE_SAP) provides services to the modified PA layer, for example, the PHY Adapter layer entity. The modified PA Layer is associated with at least one PHY entity via its PHY_ALE_SAP, wherein there may be one or more PHY entities corresponding to data lanes, denoted by PHY Lane 0 to PHY Lane 3, and PHY Lane 1 to PHY Lane 3 are optional. In this manner, the implementations of the modified PA layer and modified M-PHY with respect to the ALE are hidden from the data link layer. Thus, the PHY adapter layer SAP model for ALE facilitates the implementation of the interconnection protocol with the ALE and reduces its implementation complexity.

In some embodiments, the service access point PA_ALE_SAP can be implemented to perform new frame mapping. In some embodiments, the service access point PHY_ALE_SAP can be implemented to perform block management. The following provides examples of the new service access points for ALE: PA_ALE_SAP and PHY_ALE_SAP.

Regarding the service access point PA_ALE_SAP, the new frame mapping can be implemented for various types of protocol data units (PDU) that may be processed in the current PA layer, such as ESC_DL related PDU, ESC_PA related PDU, and data PDU.

Figure 4A:
FIG. 4A is a schematic diagram illustrating an example of ESC_DL related protocol data unit (PDU) mapping.

In an example, PA_ALE_SAP can be implemented to perform new frame mapping for ESC_DL related PDU. An example of ESC_DL related protocol data unit (PDU) mapping is illustrated in FIG. 4A, whose upper portion shows an ESC_DL related PDU and whose lower portion shows a mapping result of the PDU. In 8b/10b coding scheme, the control symbol identifier ESC_DL is used for symbol alignment and its corresponding code is unique in K-Code table in the M-PHY specification for receiver decoding. In an example of the ALE scheme, it is mapped to a control information (denoted by CTRL_INFO) PDU with a T tag. Specifically as shown in FIG. 4A, an ESC_DL related PDU, which includes an escaped data type (e.g., set to ESC_DL) and corresponding escaped payload data (e.g., denoted by EscParam_DL), is translated into a data link control information (denoted by DL_CTRL_INFO) PDU, wherein a T tag (or referred to as a link list field) indicates a link list in a control block and DL_CTRL_INFO indicates information for DL control symbols. A POS (position) field indicates DL_CTRL_INFO position in an ALE block, which will be described later. Each ALE block has a specific number of PDUs, such as 8 PDUs (128 bits). Optionally, the DL_CTRL_INFO PDU can end with a cyclic redundancy check (CRC) field, such as a CRC-5 field indicating using CCITT-CRC5 to cover and protect fields from T, DL_CTRL_INFO to POS in order to enhance reliability of transmission, wherein CCITT stands for International Telegraph and Telephone Consultative Committee.

Figure 4B:
FIG. 4B is a schematic diagram illustrating an example of ESC_PA related PDU mapping.

In another example, PA_ALE_SAP can be implemented to perform new frame mapping for ESC_PA related PDU. An example of ESC_PA related protocol data unit (PDU) mapping is illustrated in FIG. 4B, whose upper portion shows an ESC_PA related PDU and whose lower portion shows a mapping result of the PDU. In 8b/10b coding scheme, the control symbol identifier ESC_PA is used for symbol alignment and its corresponding code is unique in K-Code table in the M-PHY specification for receiver decoding. In an example of the ALE scheme, it is mapped to a CTRL_INFO PDU with a T tag. Specifically as shown in FIG. 4B, an ESC_PA related PDU, which includes an escaped data type (e.g., set to ESC_PA) and corresponding escaped payload data (e.g., denoted by EscParam_PA), is translated into a PA control information (denoted by PA_CTRL_INFO) PDU, wherein T tag indicates a link list in a control block. PA_CTRL_INFO indicates information for PA control symbols. A POS (position) field indicates PA_CTRL_INFO position in an ALE block. Each ALE block has a specific number of PDUs, such as 8 PDUs (128 bits). Optionally, the PA_CTRL_INFO PDU can end with a cyclic redundancy check (CRC) field, such as CRC-5 indicating using CCITT-CRC5 to cover and protect fields from T, PA_CTRL_INFO to POS.

Figure 4C:
FIG. 4C is a schematic diagram illustrating an example of DL or PACP data PDU mapping.

In another example, PA_ALE_SAP can be implemented to perform new frame mapping for data PDU. An example of DL or PACP data protocol data unit (PDU) mapping is illustrated in FIG. 4C, whose upper portion shows a DL or PACP data PDU and whose lower portion shows a mapping result of the PDU. The DL or PACP data PDU is directly mapped to a data PDU for the ALE scheme without changes except for removal of Bit 16 of the DL or PACP data PDU because no control symbol (K-Code) in data PDUs.

Figure 5A:
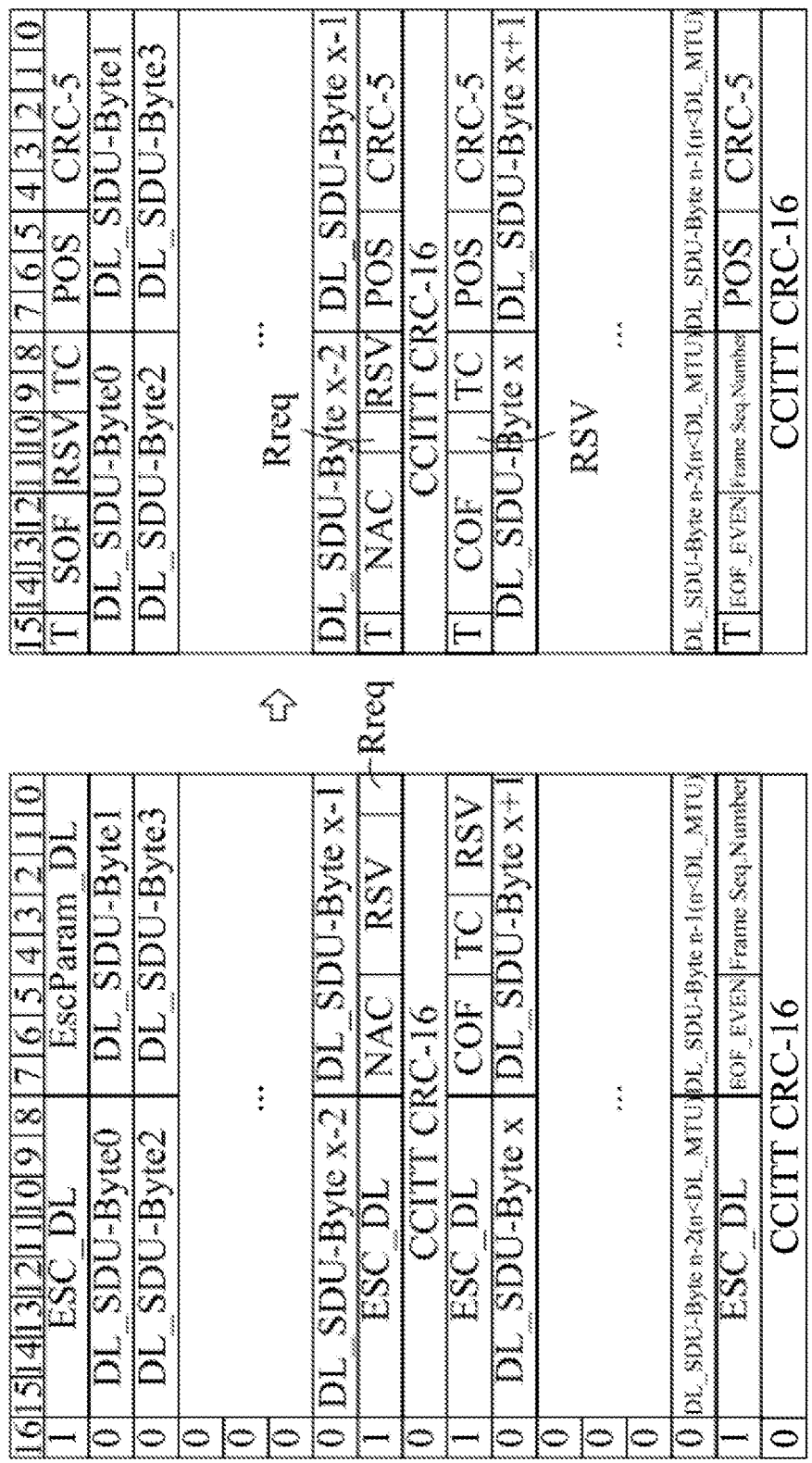
FIG. 5A is a schematic diagram illustrating examples of DL TCx frame mapping result for PA_ALE_SAP.

FIG. 5A illustrates further examples of DL TCx frame mapping result for PA_ALE_SAP in a schematic diagram, wherein TCx indicates a TC0 or TC1 frame as specified in the UniPro specification. A DL Frame with preemption based on the conventional version (e.g., version 2.0) of UniPro on the left side of FIG. 5A is mapped or translated into a DL Frame for an advanced line encoding on the right side of FIG. 5A. Specifically, the DL frame on the left side is with an even number of DL_SDU bytes and is preempted by a NAC control frame and the continuation of the preempted frame (COF) is marked by the COF control symbol, wherein DL_SDU stands for a DL service data unit having n bytes and n is less than or equal to a Maximum Payload Length denoted by DL_MTU, as specified in the UniPro specification. In FIG. 5A, it indicates that PA_ALE_SAP does the PDU mapping and treats the CRC value of the DL frame (e.g., CCITT CRC-16) as a data PDU directly. It is noted that a CRC-16 value, for example, can be calculated by the data link layer in advance. Afterward, the data link layer sends a frame with the CRC-16 value to the PA layer for block generation for ALE.

Figure 5B:
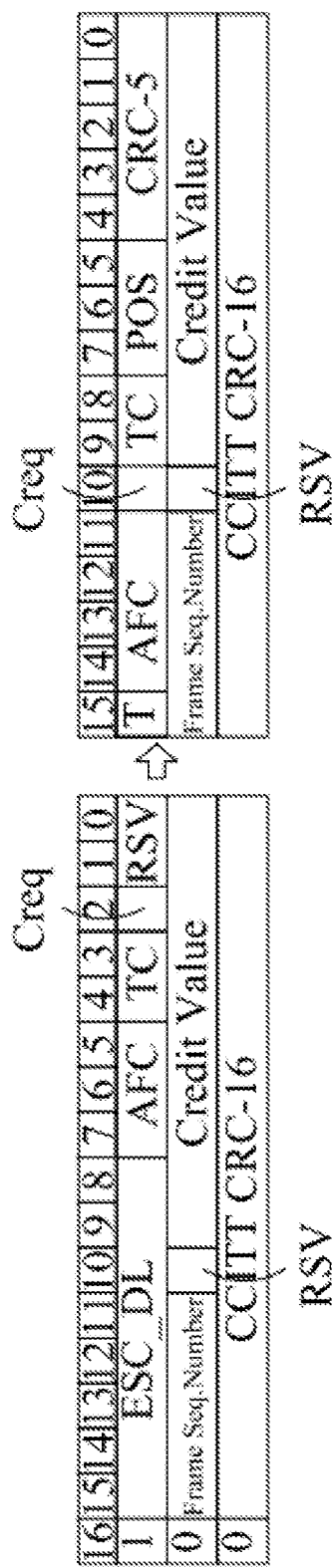
FIG. 5B is a schematic diagram illustrating an example of DL control frame mapping result for PA_ALE_SAP.

FIG. 5B illustrates an example of DL control frame mapping result for PA_ALE_SAP in a schematic diagram. A DL control frame for Acknowledgment and Flow Control (AFC Frame) based on the conventional version (e.g., version 2.0) of UniPro on the left side of FIG. 5B is translated into an AFC Frame for an ALE scheme on the right side of FIG. 5B.

Figure 5C:
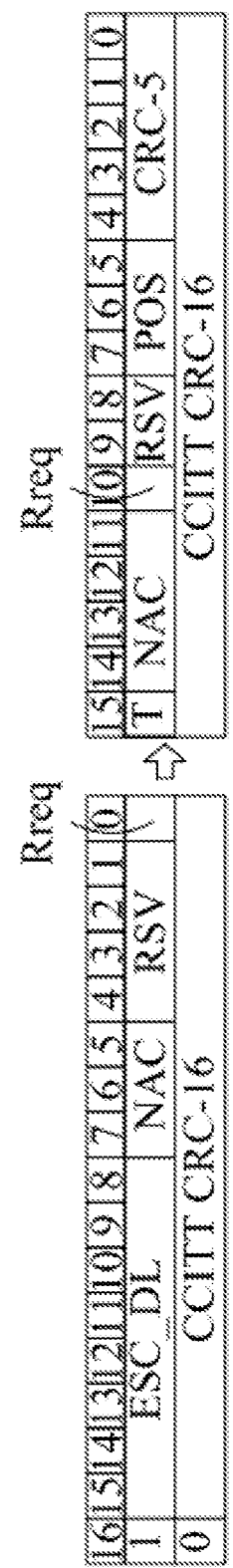
FIG. 5C is a schematic diagram illustrating another examples of DL control frame mapping result for PA_ALE_SAP.

FIG. 5C illustrates another examples of DL control frame mapping result for PA_ALE_SAP in a schematic diagram. A DL control frame for Negative Acknowledgment Control (NAC Frame) based on the conventional version (e.g., version 2.0) of UniPro on the left side of FIG. 5C is translated into a NAC Frame for an ALE scheme on the right side of FIG. 5C.

Figure 5D:
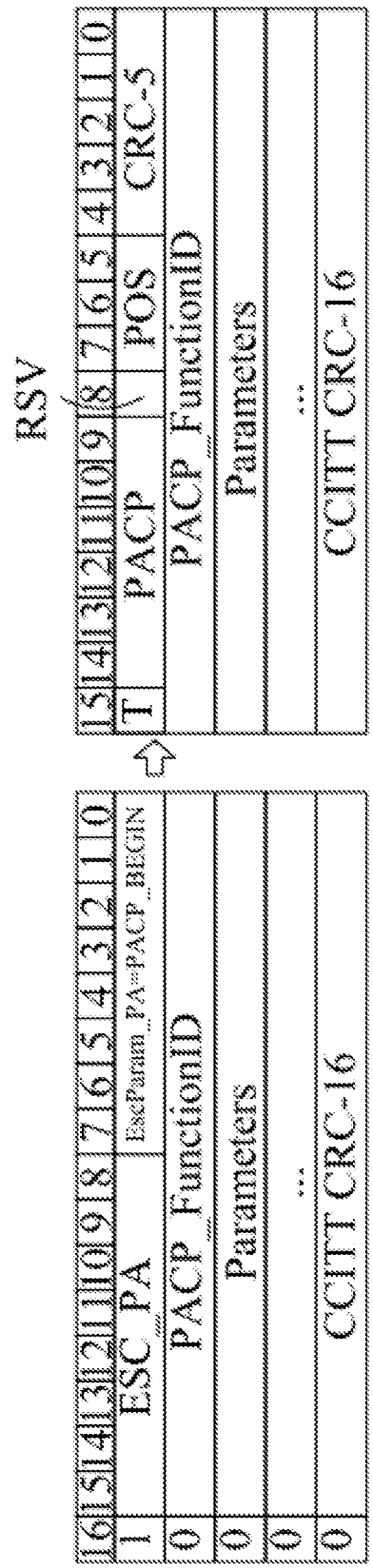
FIG. 5D is a schematic diagram illustrating an example of PACP frame mapping result for PA_ALE_SAP.

FIG. 5D illustrates an example of PACP frame mapping result for PA_ALE_SAP in a schematic diagram. A PACP frame based on the conventional version (e.g., version 2.0) of UniPro on the left side of FIG. 5D is translated into a PACP frame for an ALE scheme on the right side of FIG. 5D. In FIG. 5D, the fields or parameters, such as the escaped payload data EscParam_PA (e.g., having a value PACP_BEGIN) and a field PACP_FunctionID, for example, are set to respective values as required by the conventional UniPro specification.

For example, in a communication system such as a storage system, an ordered set pattern is implemented for symbol alignment and symbol lock operations. The ordered set pattern includes a first ordered set and a second ordered set. The first ordered set is referred to as a skip ordered set (SKP OS) and the second ordered set is referred to as a start of data stream ordered set (SDS OS), as illustrated in TABLE 1, for example.

TABLE 1

| Ordered sets | Expanded in binary (they are transmitted to the receiver side without being scrambled) |
| --- | --- |
| SKP OS = { {16{8'h99}} } | {16 {10011001}} (the code of {10011001} is repeated for 16 times) |
| SDS OS = {4 {8'hB1, {3{8'hC6}}} } | {4 {10110001, {3{11000110}}}} (the code in the first pair of {10110001, {3{11000110}}} is repeated for 4 times) |

In addition, control symbol types, such as SOF (Start of Frame), EOF_EVEN (End of Frame with even number of bytes), EOF_ODD (End of Frame with odd number of bytes), COF, NAC, and AFC, on the right side of FIG. 5A to 5D may have specific values for the ALE.

Regarding the PDU mapping as illustrated in FIGS. 4A-4B and 5A-5D, the CRC-5 fields are optional. In addition, the bit width of POS field is variable for different implementations of the ALE scheme. An ALE block indicates a group of a specific number of PDUs to be transmitted and can be referred to a PDU block as well. In the above format as shown in FIGS. 4A-4B and 5A-5D, the bit width of the POS field is 3 bits for an implementation of ALE with an ALE block of 8 PDUs (or referred to as 8-PDU ALE block). In case of a 16-PDU ALE block, its POS field can be 4 bits wide and CRC-5 field will no longer be used. In theorem, a POS field of 8 bits can be used in implementations of ALE with an ALE block of up to 256 PDUs. In addition, in the stage of the PDU mapping associated with PA_ALE_SAP, the value of a link list field (T tag) or a POS field with respect to a control information PDU (such as DL_CTRL_INFO or PA_CTRL_INFO PDU) may be set to a default value (e.g., 0 or another value) temporarily. The value of the link list field (T tag) or the POS field with respect to the control information PDU is to be determined in the stage of generation of an ALE control block by the PHY_ALE_SAP, as will be exemplified later.

Regarding the service access point PHY_ALE_SAP, in some embodiments, the block management can be implemented to perform: ordered set management; forward error correction (FEC) frame generation or extraction; and ALE data block and control block generation or extraction.

In an embodiment, PHY_ALE_SAP can be implemented to perform ordered set management for block data alignment and lock operation. For example, at least one ordered set can be adopted in an implementation of the interconnection protocol with an advanced line encoding. In the current UniPro (e.g., UniPro version 2.0) for the UFS standard, M-PHY control symbols (or referred to as K-Code) such as MARKER0 (MK0) and MARKER1 (MK1) (e.g., deskew pattern (<MK0, MK1>)) are required for a receiver side for data alignment in communication using the 8b/10b encoding scheme. In the advanced line encoding mode, such K-Code is not used. Accordingly, at least one ordered set can be adopted in an advanced line encoding mode for block data alignment and lock operation.

The ordered set pattern is not involved in scrambling operations. The ordered set pattern in TABLE 1 is unique for detection on the receiver side. Certainly, other ordered set patterns can also be designed for the same purpose as long as both the transmitter side and receiver side are implemented to adopt the designed ordered set pattern consistently.

The operations of the detection on the receiver side, for example, include at least three phases, such as an unaligned phase, an aligned phase, and a locked phase. In response to the ordered set pattern, receivers enter the unaligned phase after error correction code (ECC) un-recovered error occurs, RxLineReset is received, a new burst is detected, or the receivers are resumed from a hibernation (or denoted by H8) state. In the unaligned phase, the receiver monitors the received bit stream for a match against all bits of the SKP OS bit pattern. When one is detected, the receivers adjust their alignment to the SKP OS bit pattern and proceed to the Aligned Phase.

In the Aligned Phase, receivers monitor the received bit stream for the SKP OS and the received Blocks for a start of data stream (SDS) ordered set (OS). If an SKP bit pattern is detected on an alignment that does not match the current alignment, the receivers are in an ALE-Burst state (e.g., using ALE_RX_FSM), and the subsequent Symbol matches the first Symbol of SDS OS, then the receivers adjust their alignment to the newly received SKP OS bit pattern, wherein the ALE-Burst state can be a state of the receiver in a finite state machine (e.g., denoted by ALE_RX_FSM). If a SDS OS is received, the receivers proceed to the Locked phase. The data stream starts after the SDS OS sequence is received.

In the Locked Phase, the receivers do not adjust their Block alignment while in this phase. Data Blocks are expected to be received after the SDS OS sequence. The receivers return to the Unaligned or Aligned Phase if the Data Stream is terminated by the Link entering the hibernation state and/or a Recovered forward error correction (FEC) Error is detected.

In an embodiment, PHY_ALE_SAP can further be implemented to perform forward error correction (FEC) frame generation or extraction. An FEC scheme can be adopted to enhance data transmission reliability in the implementations of the advanced line encoding mode in conjunction with a signaling scheme such as PAM-4, PAM-8, PAM-16 signaling scheme or so on. In this regard, a new frame structure for an advanced line encoding, referred to as an ALE frame, is provided. In some embodiment, an ALE frame includes a plurality of ALE blocks (or referred to as PDU blocks), an error detection portion such as error detection codes, and an error correction portion such as error correction codes. In an embodiment, a multi-way interleaved error correction code (ECC) scheme can be adopted to generate the error correction codes. For the sake of illustration, a three-way interleaved ECC scheme is adopted in the following embodiments. Certainly, the implementation of the present disclosure (e.g., ALE frame, the FEC scheme in the ALE frame, and so on) is not limited to the embodiments or examples.

In some embodiments, an ALE frame includes a plurality of ALE blocks, a plurality of CRC bytes as error detection codes, and a plurality of ECC bytes as error correction codes. The CRC bytes protect the plurality of ALE blocks, but not the ECC bytes. The ECC bytes protect the plurality of ALE blocks and the CRC bytes. Regarding the ALE blocks, one or more DL PDU or PACP PDU can be converted into an ALE block. Two block types, ALE Data Block and ALE Control Block, are introduced. For example, an ALE block is generated based on a plurality of DL or PACP PDU, such as DL_CTRL_INFO PDU, PA_CTRL_INFO PDU, or data PDU illustrated in FIGS. 4A to 4C, or those PDUs illustrated in FIGS. 5A to 5D.

Figure 6A:
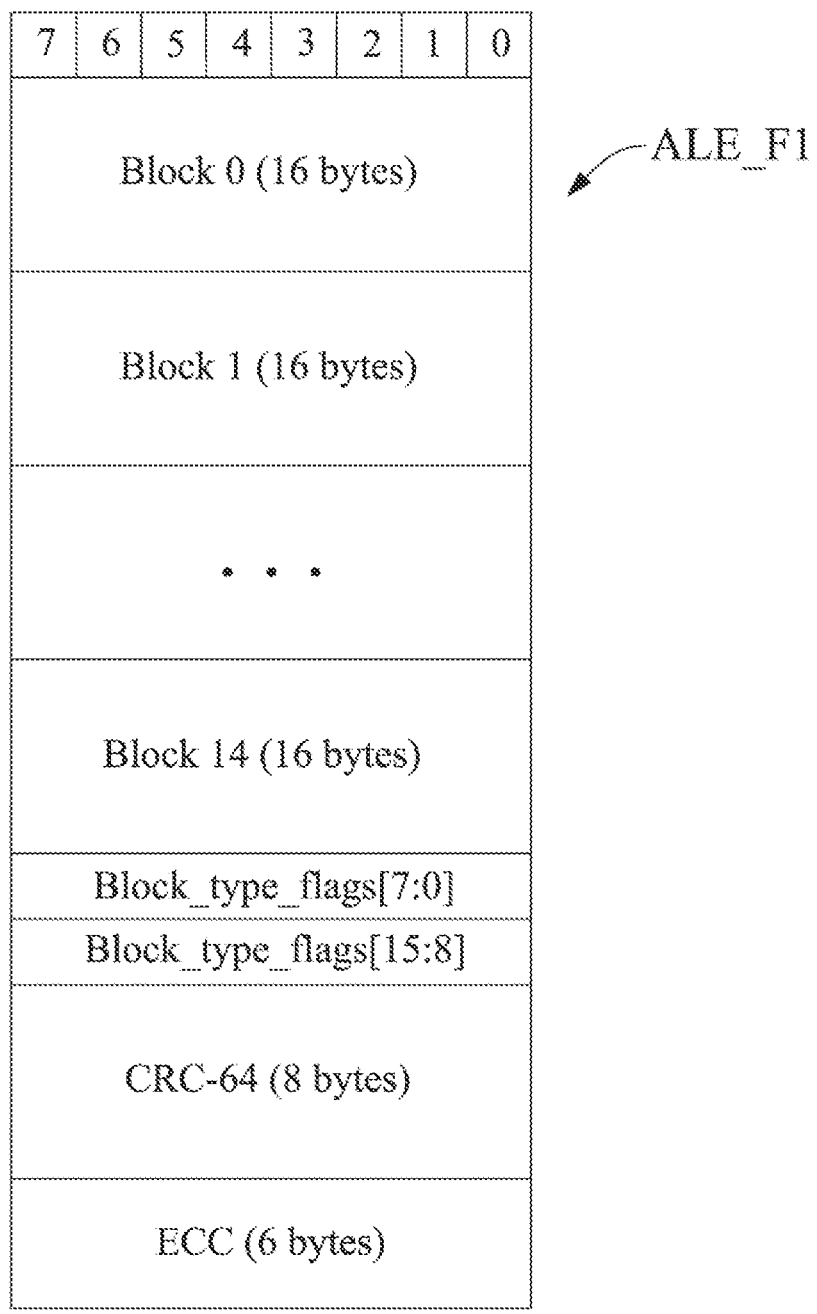
FIG. 6A is a schematic diagram illustrating an example of an ALE frame structure.

FIG. 6A illustrates an example of an ALE frame structure. As shown in FIG. 6A, an ALE frame ALE_F1 has a specific number of bytes, such as 256 bytes, wherein the numbers "0" to "7" denote bits of a byte. In the example, the ALE frame ALE_F1 has 15 ALE blocks, 8 CRC bytes, and 6 ECC bytes. For example, a first ALE block has block data of 16 bytes denoted by "Block 0" and its block type flag; a second ALE block has block data of 16 bytes (e.g., denoted by "Block 1") and its block type flag. The remaining ALE blocks can be made in a similar manner. It is noted that as illustrated in FIG. 6A, the block type flags can be grouped together and the ALE frame ALE_F1 has two bytes (e.g., denoted by Block_type_flags[7:0] and Block_type_flags[15:8]) for indicating the block type flags of the 15 blocks. For example, Block_type_flags[0] indicates the block type flag of the first ALE block associated with the block data denoted by "Block 0"; Block_type_flags[1] indicates the block type flag of the second ALE block associated with the block data denoted by "Block 1", and so on. If an ALE block including data PDUs only, the ALE block belongs to a data block category and the block type flag of the ALE block can be set to 0, for example. If an ALE block including at least one control PDUs, the ALE block belongs to a control block category and the block type flag of the ALE block can be set to 1, for example. Since the ALE frame ALE_F1 of FIG. 6A has 15 ALE blocks, Block_type_flags[15] can be reserved and can be set to 1, for example.

Figure 6B:
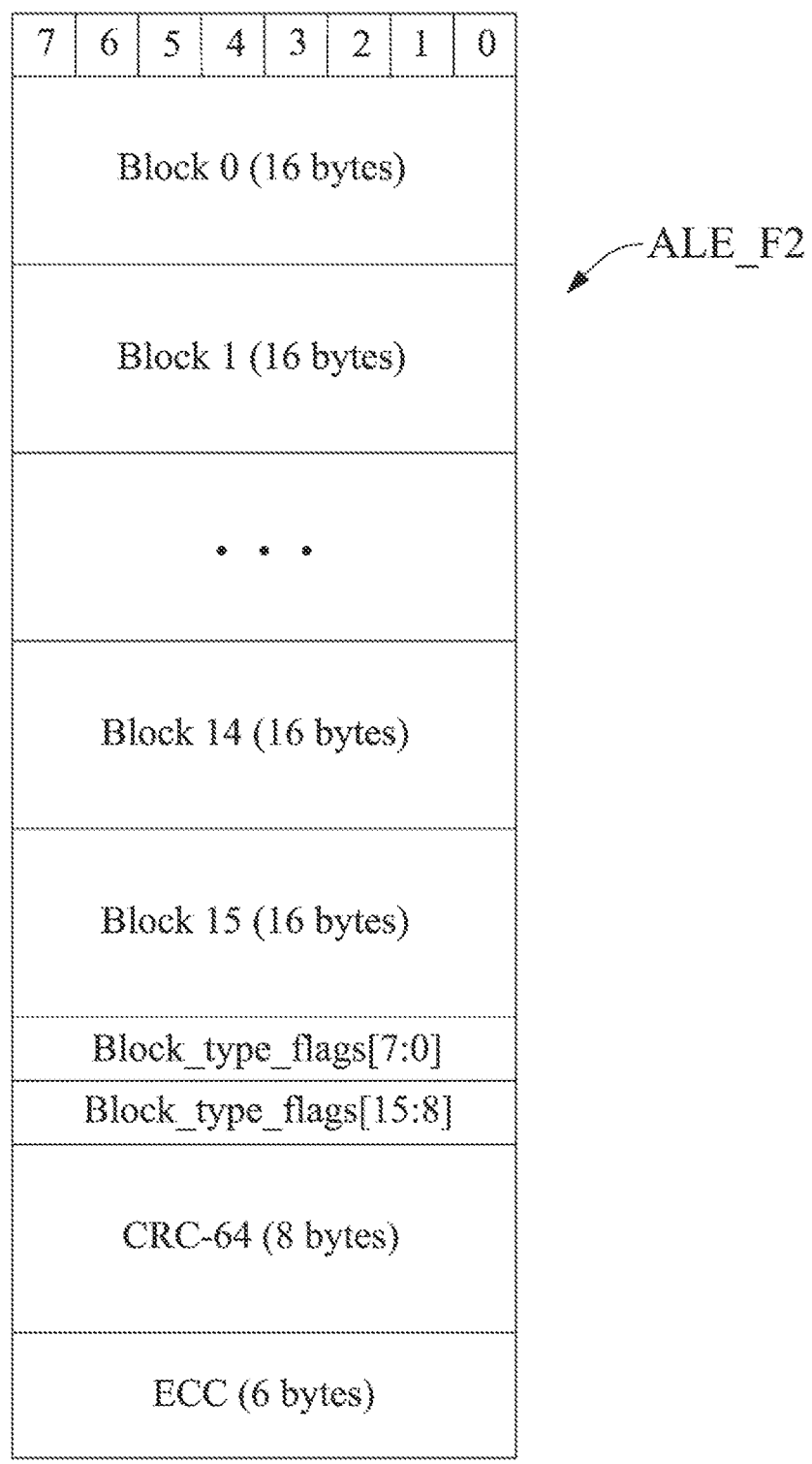
FIG. 6B is a schematic diagram illustrating another example of an ALE frame structure.

In another example of an ALE frame structure as shown in FIG. 6B, an ALE frame ALE_F2 is configured to have 16 ALE blocks and has 272 bytes with a frame structure similar to that in FIG. 6A, and thus Block_type_flags[15] of the ALE frame ALE_F2 can be used to indicate the block type of the 16th ALE block.

Figure 6C:
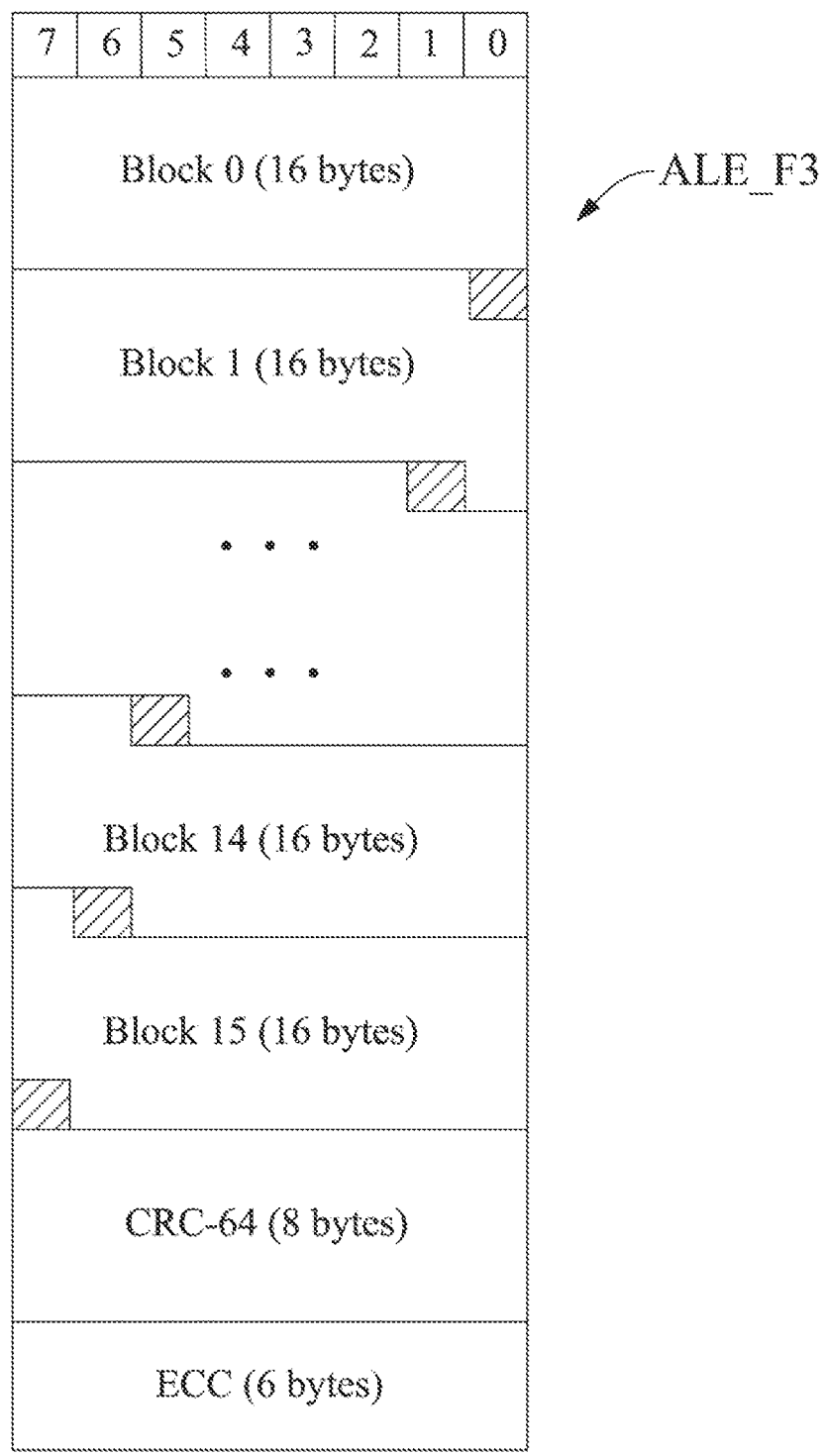
FIG. 6C is a schematic diagram illustrating another example of an ALE frame structure.

In a further example as shown in FIG. 6C, an ALE frame ALE_F3 is configured to have 16 ALE blocks and has 272 bytes also but with a frame structure different from that in FIG. 6A or FIG. 6B. As compared with FIG. 6B, the ALE frame ALE_F3 has block type flags inserted among the ALE blocks, instead of being placed after all of the ALE blocks as shown in FIG. 6A or FIG. 6B. As shown in FIG. 6C, the block type of each ALE block is placed at a position, for example, an end of the ALE block. Specifically, the ALE frame ALE_F3 has a first ALE block with block data of 16 bytes denoted by "Block 0" and its block type flag (indicated by a small rectangular filled with sloped lines) placed in a zero bit of a byte after the block data. The ALE frame ALE_F3 has a second ALE block with block data of 16 bytes denoted by "Block 1" and its block type flag placed in a first bit of a byte after the block data. The remaining ALE blocks can be obtained in a similar manner. It is noted that in FIG. 6C, the block type flags are not grouped together but distributed or inserted among the ALE blocks.

In the examples of an ALE frame structure as shown in FIG. 6A, FIG. 6B, and FIG. 6C, the ALE frames ALE_F1, ALE_F2, and ALE_F3 have the frame sizes of 256, 272, and 272 bytes respectively. Each of the ALE frames has the same overhead data of 16 bytes, wherein the overhead data includes 2 bytes for block type flags, 8 CRC bytes, and 6 ECC bytes. In other words, the ALE frames ALE_F1, ALE_F2, and ALE_F3 have the overhead percentages of 6.25% (16/256=6.25), 5.88% (16/272=5.88), and 5.88%, respectively. In this way, an ALE scheme applying one of these ALE frame structures as a unit of data transmission is capable of having an effective data rate larger than an effective data rate of 8b/10b coding scheme, under the same operating frequency or data transmission rate, because the overhead (e.g., 6.25%, 5.88%, or so on) of the ALE scheme is less than the overhead (20%) of 8b/10b coding scheme.

In addition, the ALE frame structure can also affect overall data throughput for communication between two devices using an ALE scheme. In an example, an ALE frame based on FIG. 6A or FIG. 6B is taken as a unit of data transmission for an implementation of an ALE scheme. When a first device sends an ALE frame to a second device, transmitted are block data (e.g., "Block 0," "Block 1," and so on of the ALE blocks) of the ALE frame sequentially, then associated block types (e.g., block type flags of the ALE blocks), and the CRC bytes and ECC bytes. For example, a receiver of the second device can decode a DL or PACP frame in the block data of the ALE frame only after all data of the ALE frame are received and error detection and error correction are completed. In another example, an ALE frame based on FIG. 6C is taken as a unit of data transmission for another implementation of an ALE scheme. When a first device sends an ALE frame to a second device, block data (e.g., "Block 0," "Block 1," and so on) and its associated block type flag of each ALE block are sent sequentially, and then the CRC bytes and ECC bytes. In this manner, a receiver of the second device can be configured to decode a DL control frame in a block data of a received ALE frame during a syndrome calculation phase with respect to the received ALE frame. For example, the receiver of the second device can be configured to decode a DL control frame in a received ALE block when one piece of block data (e.g., "Block 1") and its block type flag of an ALE block are received and the block type flag indicates a control block category. The DL control frames are generally implemented to be short frames having several byte data with its associated error detection code (e.g., an AFC frame or NAC frame as shown in FIG. 5A or FIG. 5B), as compared to other frames which are longer. Accordingly, it is reliable to decode the DL control frame if the error detection code indicating no errors, and send a successfully decoded DL control frame to the DL layer during a syndrome calculation phase with respect to the received ALE frame. In other words, the DL control frame can be decoded before the error detection and error correction of the received ALE frame are fully completed. As compared to the example for the ALE frame based on FIG. 6A or FIG. 6B, the example for the ALE frame based on FIG. 6C can facilitate the decoding of DL control frames earlier for a time interval which equals about at least two times a time interval for transmission or reception of an ALE frame. In general, DL control frames affect the flow control and frame exchange of communication between the first and second devices. Accordingly, the overall data throughput for communication between two devices can be enhanced by using an ALE scheme with the ALE frame based on FIG. 6C. Certainly, the implementation of the present disclosure is not limited to the embodiments and examples.

Further, it is noted that the implementation of an ALE frame is not limited to that shown in FIG. 6A, FIG. 6B, or FIG. 6C. The number of the ALE blocks in an ALE frame or the number of bytes in each of the ALE blocks can be set to other values. In some embodiments, an ALE frame can be derived from that in FIG. 6A, FIG. 6B, or FIG. 6C to include a specific number of ALE blocks, such as 8, 10, 16, 17, 18, 32, or more, whenever appropriate. In some embodiments, an ALE frame can be derived from that in FIG. 6A, FIG. 6B, or FIG. 6C with each ALE block having a specific number of bytes, such as 8, 16, 32, or more, or other value, whenever appropriate. In some embodiments, the number of error detection codes or error correction codes in an ALE frame can also be modified whenever appropriate.

In some embodiments, an ALE frame structure can be obtained based on that similar to FIG. 6C by placing the block type flag of each of the ALE blocks after the ALE block itself, as illustrated in FIG. 6C, before the ALE block itself, or at another position among the ALE blocks, instead of grouping the block type flags and placing the grouped block type flags between the block data and the CRC bytes. Regarding error detection, in some embodiments, an ALE frame can be derived from an ALE frame structure in FIG. 6A, FIG. 6B, FIG. 6C, or related examples, with its error detection portion such as error detection codes (e.g., CRC bytes) generated based on CRC calculation such as CRC-16, CRC-32, CRC-64, or so on by using a CRC engine. The CRC engine, for example, can be a CRC calculation circuit to perform associated CRC calculation including circuit components such as shift registers and logic gates. Regarding error correction, in some embodiments, an ALE frame can further be derived from the ALE frame structure in FIG. 6A, FIG. 6B, FIG. 6C or related examples, with its error correction portion such as error correction codes (e.g., ECC bytes) generated based on a multi-way interleaved ECC scheme by using multi-way interleaved ECC engines. Each of the interleaved ECC engines, for example, can be a corresponding ECC calculation circuit to generate a portion of the ECC bytes with respect to an associated portion of data of the ALE frame (e.g., a number of associated bytes of the ALE frame except for ECC bytes) based on associated ECC calculation. A receiving side can perform forward error correction on the received ALE frame using the ECC bytes.

Figure 7:
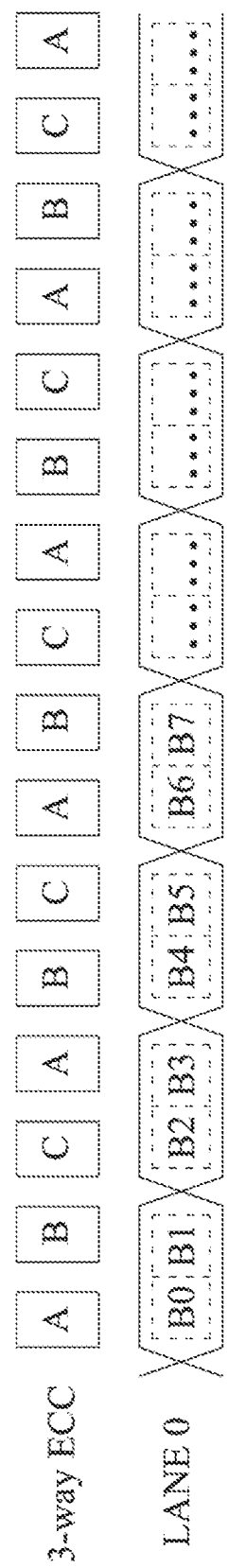
FIG. 7 is a schematic diagram illustrating three-way error correction codes interleaving.

In an embodiment, a link-based three-way interleaved ECC scheme is adopted and can be implemented by three interleaved ECC engines. An ECC engine is capable of recovering one byte. The ECC engines can be realized by hardware circuitry. FIG. 7 illustrates three-way error correction codes interleaving. On the upper portion of FIG. 7, rectangles A, B, and C represent three different ECC engines (e.g., referred to as a first ECC engine, second ECC engine, and third ECC engine) are associated with different bytes of an ALE frame, alternately, as shown on the lower portion of FIG. 7. For example, the ALE frame includes a first PDU having bytes B0 and B1, a second PDU having bytes B2 and B3, a third PDU having bytes B4 and B5, a fourth PDU having bytes B6 and B7, and so on. The bytes B0 and B1 of the first PDU are associated with the first ECC engine (A) and second ECC engines (B). The bytes B2 and B3 of the second PDU are associated with the third ECC engine (C) and first ECC engines (A). The bytes B4 and B5 of the third PDU are associated with the second ECC engine (B) and third ECC engine (C). The bytes B6 and B7 of the fourth PDU are associated with the first ECC engine (A) and second ECC engines (B). The other PDUs can be associated with the ECC engines in a similar manner, as shown in FIG. 7. In addition, when one lane, such as lane 0, is active, the ALE frame can be transmitted in order on the lane. The ALE frame can also be transmitted over multiple lanes on a sending side and be merged on the receiving side.

In addition, in an embodiment, before transmitting the ALE frame by the physical layer, the bytes of the ALE frames are scrambled to make the receiver side possible to distinguish the ordered set pattern from the scrambled data.

Regarding the service access point PHY_ALE_SAP, the block management can further be implemented to perform ALE data block generation and control block generation. In the ALE, an ALE frame serves as a unit of data transmission for the ALE scheme and the ALE frame may include a data block (or called ALE data block) or control block (or called ALE control block), which is generated based on an ALE block. As mentioned in the examples for the PA_ALE_SAP above, an ALE block (or called a PDU block) includes a specific number of PDUs resulted from the PDU mapping by the PA_ALE_SAP, such as one or more of DL_CTRL_INFO PDU, PA_CTRL_INFO PDU, and data PDU illustrated in FIGS. 4A to 4C, respectively, or those PDUs illustrated in FIGS. 5A to 5D. The specific number of PDU of the ALE block can be 8 PDUs (128 bits), 16 PDUs (256 bits), or 32 PDUs (512 bits), or any other appropriate value.

Figure 8A:
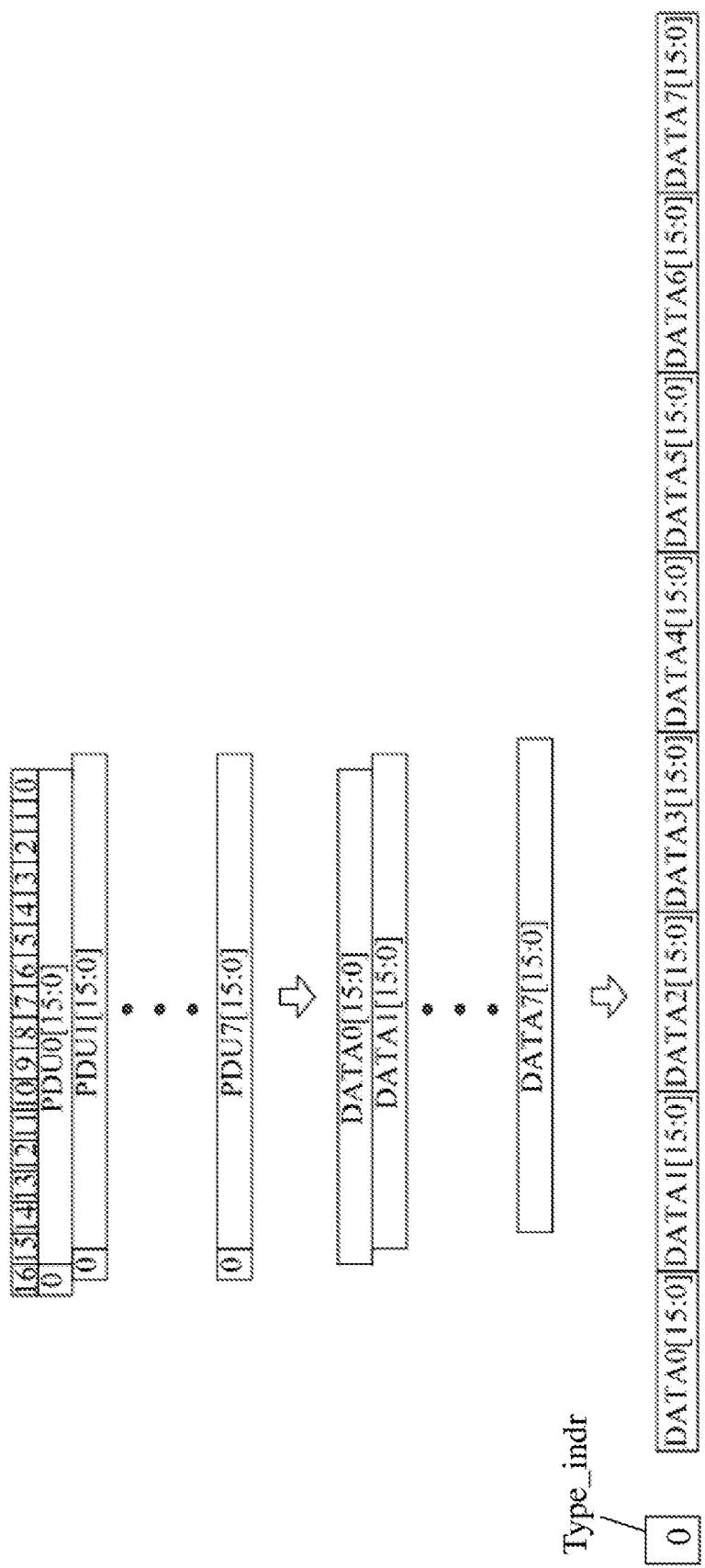
FIG. 8A is a schematic diagram illustrating an example of ALE data block generation.

In an embodiment, PHY_ALE_SAP can be implemented to perform ALE data block generation. An ALE data block includes a type indicator (denoted by Type_indr) and a specific number of the data PDUs (e.g., 8 PDUs), wherein the type indicator is set to '0', for example, to indicate the type of data block and can be a block type flag or bit. The format of an ALE data block can be represented by {Type_indr, PDUx8}. FIG. 8A illustrates an example of ALE data block generation in a schematic diagram. The PHY_ALE_SAP can be implemented to receive a plurality of data PDUs, for example, denoted by DATA0[15:0], DATA1[15:0], DATA7[15:0] as shown on the middle portion of FIG. 8A, from the PA_ALE_SAP. For example, the PA_ALE_SAP directly maps a number of DL data PDUs, for example, denoted by PDU0[15:0], PDU1[15:0], PDU7[15:0] as shown on the upper portion of FIG. 8A into the data PDUs (e.g., DATA0[15:0] to DATA7[15:0]). The PHY_ALE_SAP can be implemented to generate an ALE data block by generating a type indicator (denoted by Type_indr) and assembling a specific number of the received data PDUs (e.g., 8 PDUs), as shown on the lower portion of FIG. 8A.

Figure 8B:
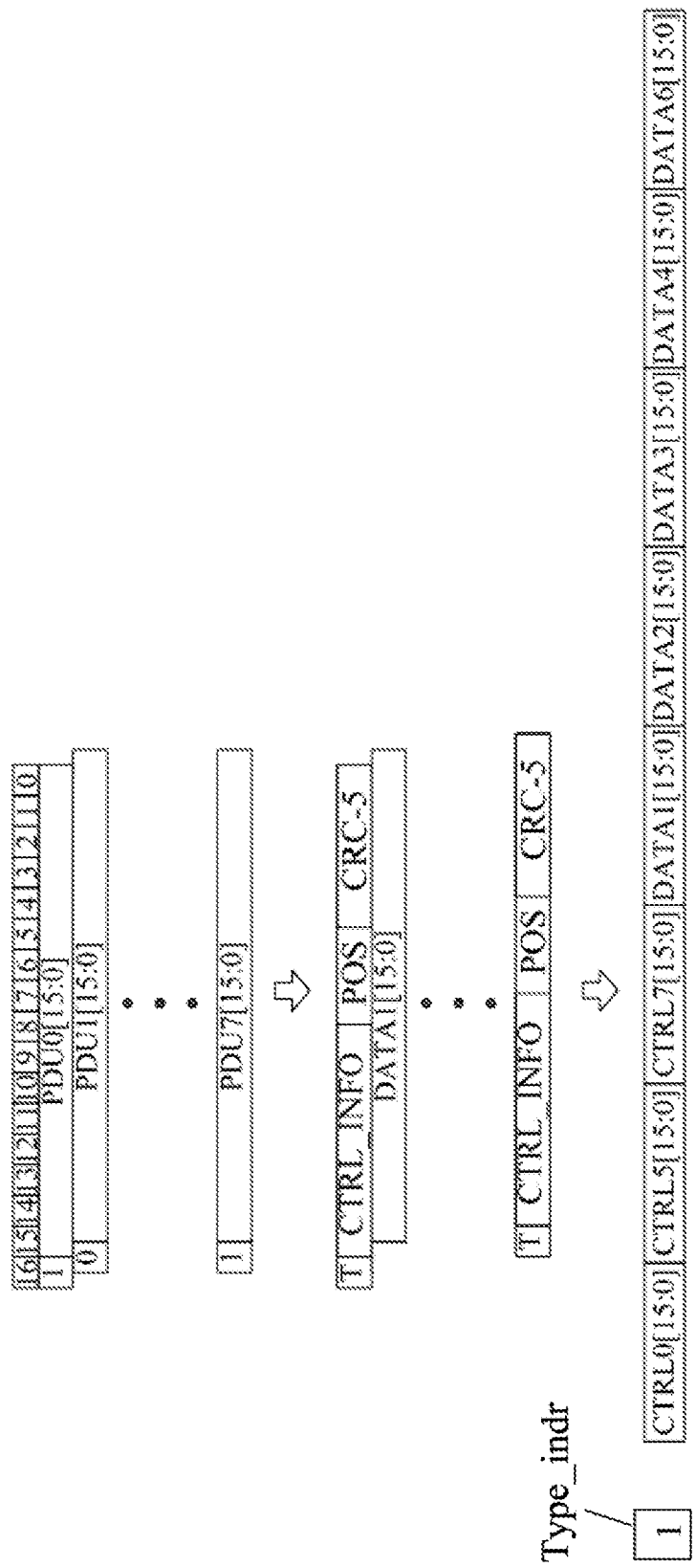
FIG. 8B is a schematic diagram illustrating an example of ALE control block generation.

In another embodiment, the PHY_ALE_SAP can be implemented to perform ALE control block generation. An ALE control block includes a type indicator (denoted by Type_indr), at least one control information PDU (or simply referred to as control PDU), such as DL_CTRL_INFO or PA_CTRL_INFO PDU, and may include one or more data information PDU (or simply referred to as data PDU), up to a specific number of PDUs (e.g., 8 PDUs)), wherein the type indicator is set to '1', for example, to indicate the type of control block and can be a block type flag or bit. The format of an ALE control block can be represented by {Type_indr, CTRL_INFO PDUs, Data PDUs}. FIG. 8B illustrates an example of ALE control block generation in a schematic diagram. The PHY_ALE_SAP can be implemented to receive a plurality of PDUs, which may include one or more CTRL_INFO PDUs and data PDUs as shown on the middle portion of FIG. 8B, from the PA_ALE_SAP. For example, the PA_ALE_SAP maps a number of PDUs from the DL layer or the PA layer into a number of PDUs for ALE. For example, the PDUs for ALE, denoted by PDU0[15:0], PDU1[15:0], PDU7[15:0], as shown on the upper portion of FIG. 8B, may include at least one ESC_DL related PDUs or ESC_PA related PDUs from the DL layer or the PA layer. The PDUs for ALE, as shown on the middle portion of FIG. 8B, may include CTRL_INFO PDUs and data PDUs. The PHY_ALE_SAP can be implemented to generate an ALE control block based on the PDUs for ALE by generating a type indicator (denoted by Type_indr) and assembling a specific number of the PDUs (e.g., 8 PDUs) including at least one control PDU, as shown on the lower portion of FIG. 8B. In the ALE control block, all of the CTRL_INFO PDUs (e.g., CTRL0[15:0], CTRL5[15:0], CTRL7[15:0]) are arranged in series before any data PDUs (e.g., DATA1[15:0], DATA2[15:0], . . . ) of the ALE block, as illustrated on the lower portion of FIG. 8B. In other words, the PHY_ALE_SAP can be implemented to reorder the PDUs for ALE to generate the ALE control block.

In the above examples, a type indicator can be implemented by a bit of data. In other examples, the type indicator may be implemented by two or more bits of data, whenever appropriate.

Figure 8C:
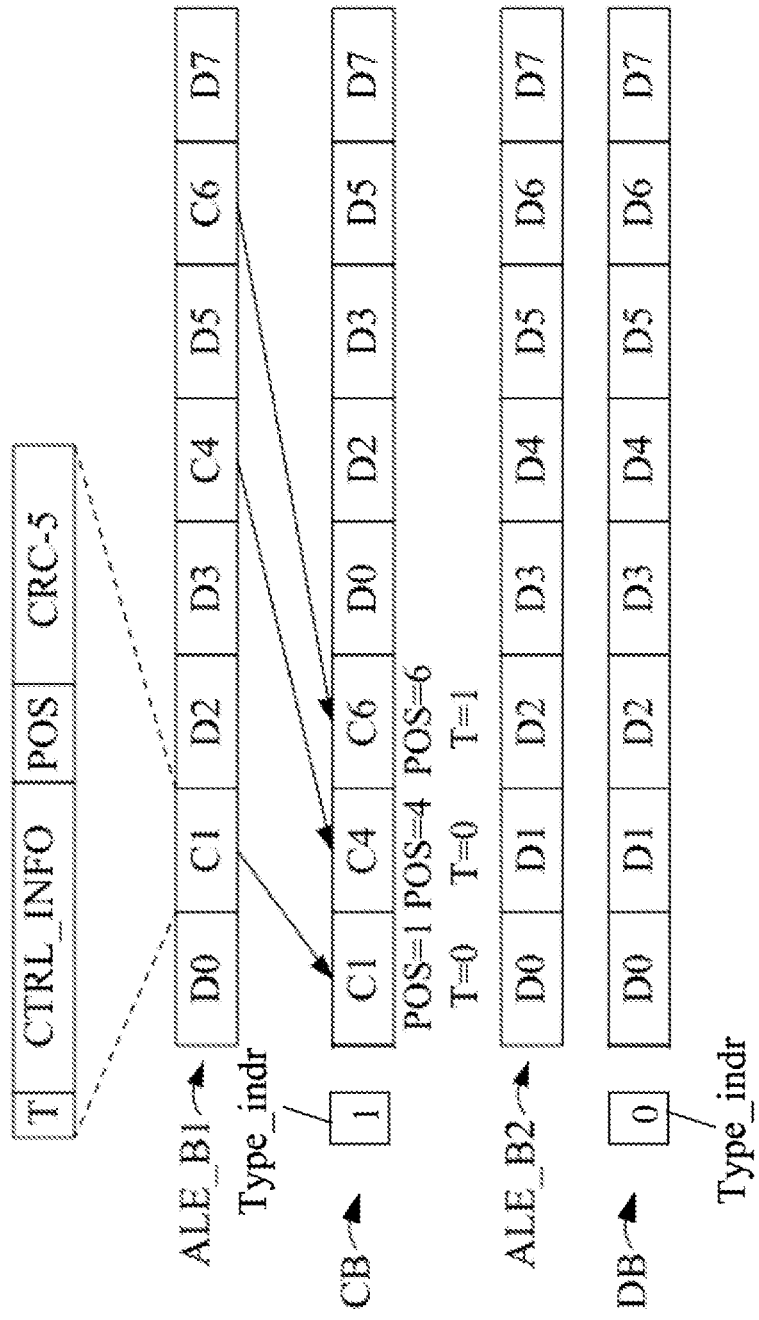
FIG. 8C is a schematic diagram illustrating examples of ALE control block reordering.

Referring to FIG. 8C, an example of ALE control block reordering (or referred to as control symbol reordering) is illustrated in a schematic diagram. In this example, the PHY_ALE_SAP receives a specific number (e.g., 8) of PDUs, denoted by D0, C1, D2, D3, C4, D5, C6, and D7, as an ALE block (denoted by ALE_B1) from the PA_ALE_SAP, wherein D0, D2, D3, D5, and D7 represent respective data PDUs; and C1, C4, and C6 represent respective control PDUs. In the ALE block ALE_B1, for example, there are 3 control symbols (or control PDUs), namely C1, C4, and C6, locating at positions 1, 4, and 6, respectively, in relation to D0 locating at position 0. The PHY_ALE_SAP generates an ALE control block (denoted by CB) based on the ALE block ALE_B1 by using reordering the 8 PDUs of the ALE block ALE_B1. After reordering, the control symbols C1, C4, and C6 are arranged or placed in series before any data PDUs in the ALE control block CB, as illustrated in FIG. 8C. Specifically, the control symbol C1 is arranged on the first PDU location of the ALE control block CB and has its POS field with a value of '001' in binary. The control symbol C4 is arranged on the second PDU location of the ALE control block CB and has its POS field with a value of '100' in binary (or 4 in decimal). In addition, the control symbol C6 is arranged on the third PDU location of the ALE control block CB and has its POS field with a value of '110' in binary (or 6 in decimal). Meanwhile, after the reordering, the T tags of the control symbols C1, C4, and C6 are set to 0, 0, and 1, respectively, to indicate whether there is another control symbol (or control PDU) in the ALE block ALE_B1 which is placed after the control symbol in the ALE control block CB (or the ALE block ALE_B1). In this ALE control block CB, a control symbol with a T tag of value 0, such as C1 and C4, indicates that there is another control symbol follows or is placed after the current control symbol while a control symbol with a T tag of value 1, such as C6, indicates that there is no control symbol follows C6 and, in other words, it is the last control symbol in this ALE control block CB and that one or more data symbols, if any, follow the last control symbol C6 in the ALE control block CB.

As illustrated above, the DL frames or PACP frames on the sending side, such as a host (or a device), are translated into ALE control blocks or data blocks. The modified M-PHY for the ALE can be implemented to transmit the ALE control blocks or data blocks to a receiving side (or called receiver side), such as a device (or a host).

On the receiver side, a modified version of UniPro can be implemented to restore the PDUs of an ALE control block to its former ordering by checking the POS fields of the control symbols of the ALE control block. An embodiment of a process for restoring operations is as follows. First, finding a type indicator of a control block is performed, wherein the control block has at least one PA_CTRL_INFO or DL_CTRL_INFO. Secondly, a control symbol, e.g., PA_CTRL_INFO or DL_CTRL_INFO, from the first PDU is extracted. The T tag of the control symbol is then examined. If T=0, extraction of the followed PA_CTRL_INFO or DL_CTRL_INFO on the next PDU is performed. If T=1, extraction of the followed data PDU on the next PDU is performed. Restoring PA_CTRL_INFO or DL_CTRL_INFO PDUs is performed after the examination of the last PDU.

As above mentioned, in the ALE scheme, there is no K-Code (control symbols) of 8b/10b coding scheme for the receiver to do symbol alignment and symbol lock operation. In order to resolve symbol alignment and symbol lock issue in the ALE scheme, an ALE control block is generated on the transmitter side as illustrated above by using reordering control symbols to be transmitted for symbol alignment and symbol lock and the ALE control block can then be restored on the receiver side accordingly.

TABLE 2 illustrates an example of control symbols mapping for the ALE.

TABLE 2

| | T | ALE_EscParam | | | | | | POS | CRC-5 |
|---|---|---|---|---|---|---|---|---|---|
| ALE_EscType | bit 15 | bit 14 | bit 13 | bit 12 | bit 11 | bit 10 | bit 9 | bit 8 | bit 7:5 | Bit 4:0 |
| SOF | | 2'b00 | | 0 | Rsvd | Rsvd | TC | | |
| AFC | | 2'b00 | | 1 | Rsvd | CReq | TC | | |
| COF | | 2'b01 | | 2'b00 | | Rsvd | TC | | |
| NAC | | 2'b01 | | 2'b01 | | RReq | Rsvd | Rsvd | |
| <FLR, FLR> | | 2'b01 | | 4'b1000 | | | | Rsvd | |
| <MK4, MK4> | | 2'b01 | | 4'b1001 | | | | Rsvd | |
| <MK2, FLR> | | 2'b01 | | 4'b1010 | | | | Rsvd | |
| <MK2, MK2> | | 2'b01 | | 4'b1011 | | | | Rsvd | |

TABLE 2-continued

| ALE_EscType | T bit 15 | ALE_EscParam | | | | | | | POS bit 7:5 | CRC-5 Bit 4:0 |
|---|---|---|---|---|---|---|---|---|---|---|
| | | bit 14 | bit 13 | bit 12 | bit 11 | bit 10 | bit 9 | bit 8 | | |
| Reserved | | 2'b01 | | | 4'b1100 | | | | Rsvd | |
| Reserved | | 2'b01 | | | 4'b1101 | | | | Rsvd | |
| Reserved | | 2'b01 | | | 4'b1110 | | | | Rsvd | |
| PACP | | 2'b01 | | | 4'b1111 | | | | Rsvd | |
| EOF_EVEN | | 2'b10 | | | Frame Sequence Number | | | | | |
| EOF_ODD | | 2'b11 | | | Frame Sequence Number | | | | | |

As illustrated in TABLE 2, the control symbol types (denoted by ALE_EscType), such as SOF, AFC, COF, NAC, <FLR, FLR>, <MK4, MK4>, <MK2, FLR>, <MK2, MK2>, PACP, EOF_EVEN, EOF_ODD, for the ALE (e.g., some of them appear on the right side of FIG. 5A to 5D) may have specific values corresponding to escaped parameters (denoted by ALE_EscParam) of the control symbol (or control PDU) for the ALE. In TABLE 2, as can be defined in the conventional UniPro specification or further defined, TC stands for traffic class; CReq stands for credit transmit request; RReq stands for reset link request; frame sequence number is used with each data frame. Some fields are reserved (denoted by Rsvd or RSV).

In addition, as compared to the 8b/10b coding scheme used in the conventional UniPro and M-PHY specifications, it is not necessary for an implementation of the ALE scheme with data scrambling to use the conventional UniPro IDLE symbol encoding. M-PHY symbol pairs <MK3, FLR>, <MK3, DAT>, <DAT, FLR> are also not used in the implementation of the advanced line encoding.

The following provides various embodiments for implementation of the interconnection protocol with the ALE based on FIG. 1.

Figure 9A:
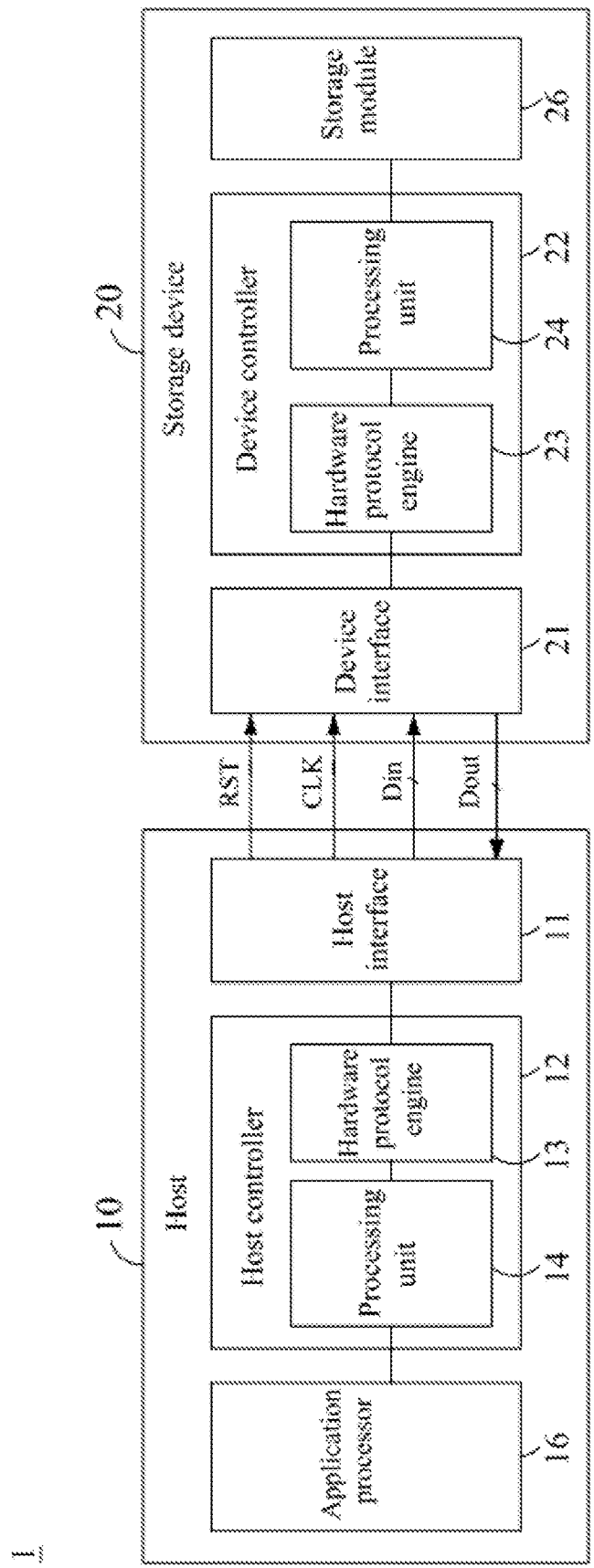
FIG. 9A is a diagram illustrating circuit architecture of a storage system for an interconnection protocol with an ALE according to an embodiment of the present invention.
Figure 9B:
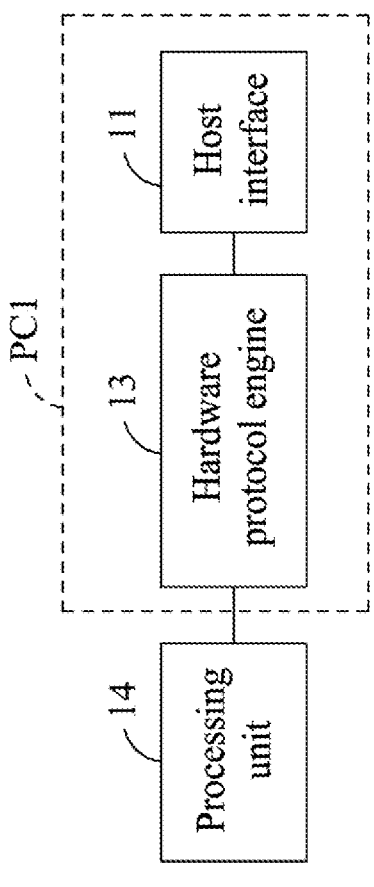
FIG. 9B is a block diagram illustrating circuit architecture applicable to the controller in FIG. 9A for the interconnection protocol according to an embodiment of the present invention.
Figure 9C:
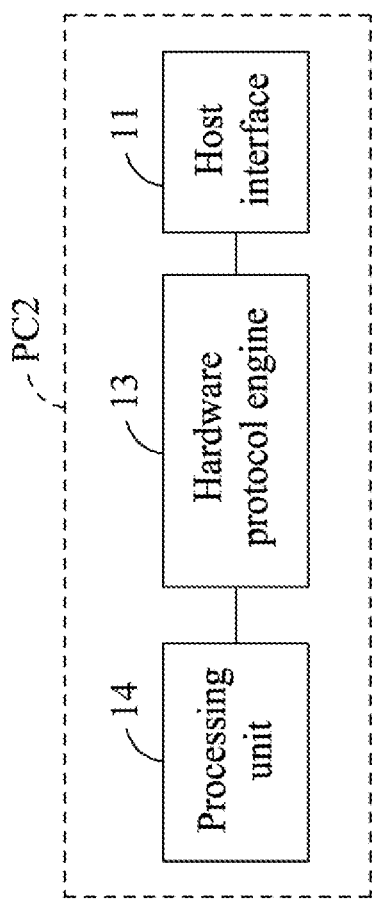
FIG. 9C is a block diagram illustrating circuit architecture applicable to the controller in FIG. 9A for the interconnection protocol according to an embodiment of the present invention.

Referring to FIG. 9A, a diagram of circuit architecture is shown according to an embodiment of the present invention. As shown in FIG. 9A, a storage system 1 includes a host 10 and a storage device 20. The host 10 and the storage device 20 communicate through an interconnection protocol in between, thereby allowing the host 10 to perform data access of the storage device 20. The interconnection protocol is the interconnection protocol with the ALE as mentioned above based on FIG. 1. Based on the circuit architecture in FIG. 9A, the foregoing technique is applicable to a first device (for example, the storage device 20 in FIG. 9A) capable of linking to a second device (for example, the host 10 in FIG. 9A) based on the interconnection protocol, and is also suitable in an application scenario where the first device is the host 10 and the second device is the storage device 20. In the circuit architecture of FIG. 9A, a controller in the host 10 or the storage device 20 used to implement the interconnection protocol may be implemented by various configurations. As shown in FIG. 9A, the controller (for example, a host controller 12) in the host 10 used to implement the interconnection protocol or the controller (for example, a device controller 22) in the storage device 20 used to implement the interconnection protocol can be implemented as circuit architecture including a hardware protocol engine and a processing unit, wherein the processing unit of the controller is optional. In another example, as shown in FIG. 9B, the controller in the host 10 used to implement the interconnection protocol is referred to as, for example, a protocol controller PC1, which can be configured to include a host interface 11 and a hardware protocol engine 13 and be implemented as a single chip, wherein a processing unit 14 may be regarded as an external circuit of the protocol controller PC1. Moreover, similarly, the controller (or referred to as a protocol controller of the storage device 20) in the storage device 20 used to implement the interconnection protocol can be configured to include a device interface 21 and a hardware protocol engine 23 and be implemented as a single chip, wherein a processing unit 24 may be regarded as an external circuit of the protocol controller. For another example, as shown in FIG. 9C, the controller in the host 10 used to implement the interconnection protocol, for example, a protocol controller PC2, can be configured to include the host interface 11, the hardware protocol engine 13 and the processing unit 14, and be implemented as a single chip. Moreover, similarly, the controller (or referred to as a protocol controller of the storage device 20) in the storage device 20 used to implement the interconnection protocol can be configured to include the device interface 21, the hardware protocol engine 23, and the processing unit 24, and be implemented as a single chip. Thus, based on the circuit architecture in FIG. 9A, the controller used to implement the interconnection protocol in the host 10 or the storage device 20 can be regarded to cover or represent the embodiment based on FIG. 9A, FIG. 9B, or FIG. 9C. The description of other examples related to FIG. 9A is also suitable for the embodiments based on FIG. 9A, FIG. 9B, or FIG. 9C.

The circuit architecture shown in FIG. 9A has sufficient flexibilities and can be efficiently configured to meet requirements of different products, so as to adapt to diversified designs of manufacturers for better product development. The host 10 is, for example, a computing device such as a smartphone, a tablet computer, or a multimedia device. The storage device 20 is, for example, a storage device inside or outside the computing device, and is such as a storage device based on a non-volatile memory. The storage device 20 can be written with data under control of the host 10 or provide written data to the host 10. The storage device 20 can be implemented as an internal memory device, memory card, solid state drive (SSD), or so on; however, the implementation of the present disclosure is not limited to the examples above.

The host 10 includes the host interface 11, the host controller 12, and an application processor 16.

The host interface 11 implements a physical layer of the interconnection protocol so as to link to the storage device 20. For example, the host interface 11 implements a modified version of physical (M-PHY) layer as exemplified above.

The host controller 12 is coupled between the host interface 11 and the application processor 16. When the application processor 16 needs to perform data access of the storage device 20, it sends a corresponding access operation command or write data to the host controller 12 and communicates with the storage device 20 through the interconnection protocol, thereby completing data access of the storage device 20.

The host controller 12 includes, for example, the hardware protocol engine 13 and the processing unit 14, wherein the processing unit 14 is optional.

The hardware protocol engine 13 implements a link layer of the interconnection protocol. The link layer can be implemented based on a modified version of UniPro as exemplified above. The hardware protocol engine 13 communicates with the host interface 11 and the processing unit 14 and performs data conversion based on the specification of the link layer.

The processing unit 14 is coupled to the hardware protocol engine 13, and communicates with the application processor 16. The processing unit 14 can execute one or more pieces of firmware. For example, an access operation command or write data sent by an operating system, a driver, or an application executed by the application processor 16 is converted into a command or data in a format compliant with the link layer of the interconnection protocol by the firmware executed by the processing unit 14, and is then sent to the hardware protocol engine 13 for processing based on specification of the link layer. Alternatively, read data returned by the storage device 20 in response to a read command of the host 10 is returned to the hardware protocol engine 13 based on the specification of the link layer of the interconnection protocol, and is converted by the corresponding firmware executed by the processing unit 14 into data in a format that is compliant with and readable by the operating system, driver, or application executed by the application processor 16. The firmware can be stored, for example, in an internal memory of the processing unit 14, or be stored in an internal memory of the host controller 12, wherein the internal memory can include a volatile memory and a non-volatile memory. The processing unit 14 is optional, that is, the task of the firmware above may be implemented at the hardware protocol engine 13 by using hardware.

The storage device 20 includes the device interface 21, the device controller 22, and a storage module 26.

The device interface 21 implements a physical layer of the interconnection protocol to link to the host 10. For example, the device interface 21 is for implementing a modified version of physical (M-PHY) layer as exemplified above.

The device controller 22 is coupled between the device interface 21 and the storage module 26. The device controller 22 fundamentally has functions corresponding to those of the host controller 12 described above. When the host 10 issues and sends an access operation command or write data to the storage device 10 through the interconnection protocol, the device controller 22 converts the received data into a corresponding access operation command or write data through the interconnection protocol so as to facilitate data access to be performed by the storage module 26. Alternatively, the device controller 22 returns, based on the link layer of the interconnection protocol, read data returned by the storage device 20 in response to the read command of the host 10 to the host 10. The storage module 26 includes, for example, a memory chip of one or more non-volatile memories, and is, for example, a flash memory chip. Herein, in one example, the storage device 20 may further be provided with a flash memory controller. The flash memory controller is coupled between the device controller 22 and the storage module 26, and can be configured to control write, read, or erase operations of the storage module 26, and is capable of data exchange with the storage module 26 through an address bus or a data bus. In another example, the flash memory controller may be further provided in the device controller 22.

The device controller 22 includes, for example, the hardware protocol engine 23 and the processing unit 24, wherein the processing unit 24 is optional.

The hardware protocol engine 23 implements a link layer of the interconnection protocol. The link layer can be implemented based on a modified version of UniPro as exemplified above. The hardware protocol engine 23 communicates with the device interface 21 and the processing unit 24 and performs data conversion based on the specification of the link layer.

The processing unit 24 is coupled to the hardware protocol engine 23, and communicates with the host 10 through the device interface 21. The processing unit 24 can execute one or more pieces of firmware. For example, the processing unit 24 executes one or more pieces of firmware to communicate with the above flash memory controller, so as to exchange data such as an access operation command, write data or read data between the interconnection protocol and the flash memory controller. The firmware can be stored, for example, in an internal memory of the processing unit 24, an internal memory of the device controller 22, or a predetermined storage region of the storage module 26, wherein the internal memory can include a volatile memory and a non-volatile memory.

As shown in FIG. 9A, the host interface 11 can be coupled to the device interface 21 through data lines Din and Dout for transmitting/receiving data, a reset line RST for transmitting a hardware reset signal, and a clock line CLK for transmitting data. The data lines Din and Dout can be implemented in multiple pairs, wherein one pair of data lines Din or one pair of data lines Dout can be referred to as a lane. The host interface 11 can communicate with the device interface 21 by using at least one interface protocol based on an ALE scheme; however, the implementation of the disclosure is not limited to the examples above. Under a modified version of the UFS standard, the host 10 and the storage device 20 may also be configured with multiple lanes in between to improve transmission efficiency, wherein either of the directions from the host 10 to the storage device 20 or from the storage device 20 to the host 10 can support one or more lanes, and the multiple lanes can be selectively set to be active or inactive.

A modified version of the UFS standard is taken as an example of the interconnection protocol with the ALE for illustration. The UFS standard includes a UFS command set (UCS) layer, a UFS transport (UTP) layer, and a UFS interconnect (UIC) layer. The UIC layer includes a link layer and a physical layer. In the interconnection protocol with the ALE, the link layer of the UIC layer can be defined based on a modified version of the UniPro specification, and the physical layer of the UIC layer can be defined based on a modified version of the M-PHY specification. Under the interconnection protocol, since the implementations of the modified UniPro and modified M-PHY with respect to the ALE are hidden from the other layers (such as UCS, UTP layers) of the UFS standard, the PHY adapter layer SAP model for ALE as illustrated in FIG. 3 facilitates the implementation of the interconnection protocol with the ALE and reduces its implementation complexity.

Figure 10:
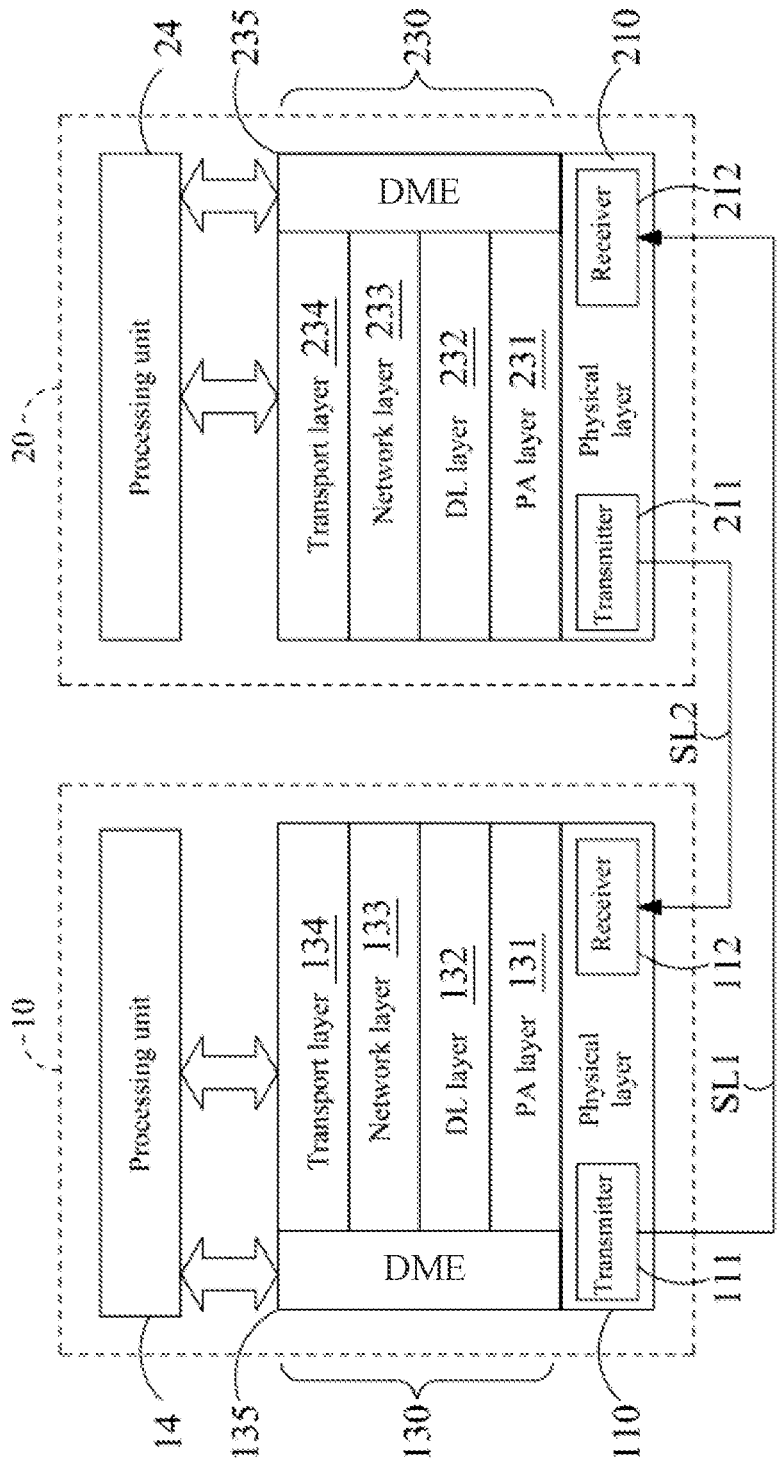
FIG. 10 is a schematic diagram of a layered structure of the storage system in FIG. 9A according to the interconnection protocol with an ALE.

Referring to FIG. 10, a schematic diagram of layered architecture of the storage system in FIG. 9A is shown based on the UFS standard and FIG. 1. Because the UFS standard is based on the MIPI UniPro layer and the MIPI M-PHY layer, the host interface 11 and the hardware protocol engine 13 of the host 10 shown in FIG. 9A are respectively used to implement a modified physical layer 110 and a modified UniPro layer 130 in FIG. 10. The modified physical layer 110 and modified UniPro layer 130 are the corresponding layers in the host as shown in FIG. 1. Also, the device interface 21 and the hardware protocol engine 23 of the storage device 20 in FIG. 9A are respectively used to implement a modified physical layer 210 and a modified UniPro layer 230 in FIG. 10. Likewise, the modified physical layer 210 and modified UniPro layer 230 are the corresponding layers in the device as shown in FIG. 1.

As shown in FIG. 10, the modified UniPro layer 130 (or 230) can include a modified PHY adapter (PA) layer 131 (or 231), a data link (DL) layer 132 (or 232), a network layer 133 (or 233), and a transport layer 134 (or 234). The layers in the modified UniPro layer 230 of the storage device 20 can also similarly operate and be implemented.

The modified PHY adapter layer (131 or 231) couples the modified physical layer (110 or 210) to the data link layer (132 or 232). The modified PHY adapter layer (131 or 231) is capable of performing bandwidth control and power management between the modified physical layer (110 or 210) and the data link layer (132 or 232). In practice, the modified physical layer 110 of the host 10 includes a transmitter (TX) 111 and a receiver (RX) 112, and the modified physical layer 210 of the storage device 20 includes a transmitter (TX) 211 and a receiver (RX) 212, thereby establishing data lanes SL1 and SL2 to perform full duplex communication. The modified UniPro specification may support multiple data lanes for a link in each transmission direction (for example, forward or backward).

The data link layer (132 or 232) is capable of performing flow control of data transmission between the host 10 and the storage device 20. As mentioned above, the implementations of the modified PA layer and modified M-PHY capable of performing the ALE are hidden from the data link layer. Accordingly, the data link layer can be implemented based on the UniPro specification (e.g., UniPro 2.0), wherein data link (DL) framing can be similar or the same as that based on the UniPro specification (e.g., UniPro 2.0). In this way, the circuitry (such as logic circuits) for implementing the DL layer based on the UniPro specification (e.g., UniPro 2.0) can be used to implement the circuitry of the modified UniPro.

The network layer (133 or 233) is used to select a routing function for a transmission path for the packets received from the transport layer (134 or 234).

The transport layer (134 or 234) can use a command received from the UFS application layer to configure a data segment suitable for the protocol and transmit the data segment to the network layer (133 or 233), or can extract a command from packets received from the network layer (133 or 233) and transmit the command to the UFS application layer.

Moreover, the modified UniPro layer (130 or 230) can further be defined with a device management entity (DME) (135 or 235), which can communicate with the layers in the modified physical layer (110 or 210) and the modified UniPro layer (130 or 230), for example, the modified PHY adapter layer (131 or 231), the data link layer (132 or 232), the network layer (133 or 233), and the transport layer (134 or 234), so as to communicate with the UFS application layer, thereby implementing the modified unified protocol (UniPro) overall functions such as control or configuration functions including power-on, power-off, reset, and power mode change.

Figure 11:
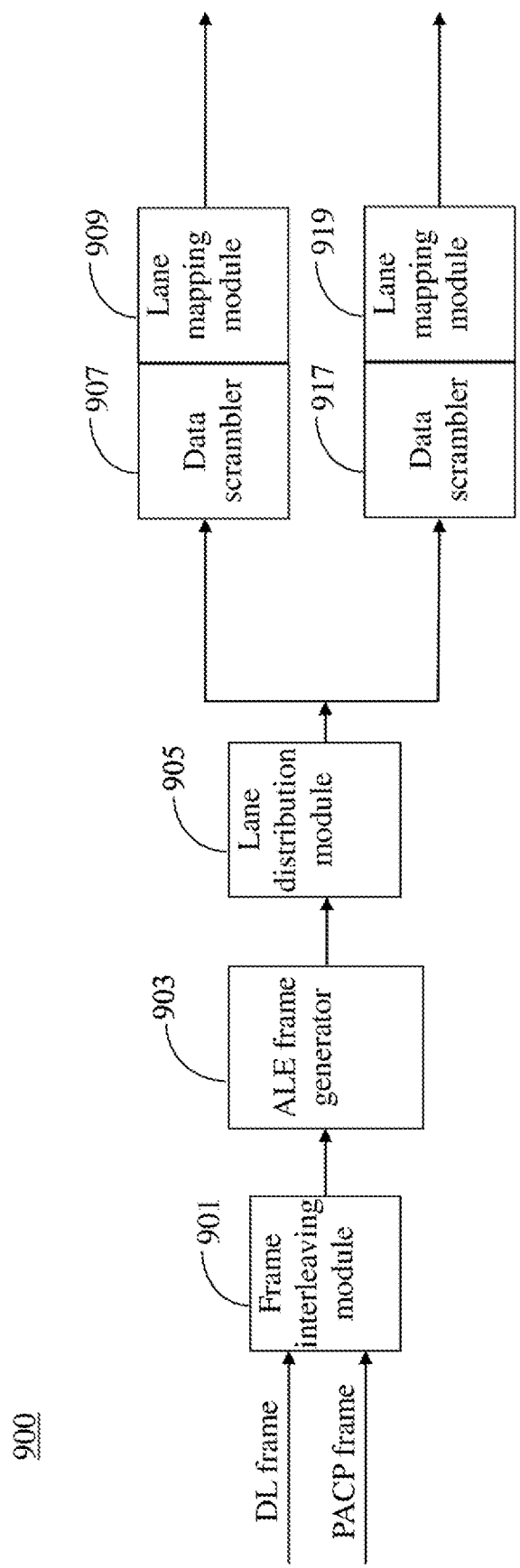
FIG. 11 is a block diagram illustrating circuit architecture applicable to the controller in FIG. 9A for a PA layer transmitter for the interconnection protocol according to an embodiment of the present invention.

FIG. 11 illustrates circuit architecture applicable to the controller in FIG. 9A for a PA layer transmitter for the interconnection protocol with the ALE according to an embodiment of the present invention. A PA layer transmitter 900 can be implemented based on the circuit architecture illustrated in FIG. 11 to process DL frames or PACP frames and generate corresponding ALE frames, for example, illustrated in FIG. 6A, 6B, or 6C, or related examples, in order to transmit the corresponding ALE frames through the physical layer, e.g., a modified M-PHY, of the sending side to a receiving side. The PA layer transmitter 900 includes a frame interleaving module 901, an ALE frame generator 903, a lane distribution module 905, data scramblers 907, 917, and lane mapping modules 909, 919.

For example, the frame interleaving module 901 receives one or more DL frames or PACP frames and interleaves the DL or PACA frames or both of them. The ALE frame generator 903 receives the interleaved frames from the frame interleaving module 901 and performs ALE block generation, CRC calculation, and ECC generation on the interleaved frames. The lane distribution module 905 receives data of ALE frames from the ALE frame generator 903 and distributes the data of the ALE frames over subsequent modules dedicated to one or more lanes. For example, the data scrambler 907 and lane mapping module 909 of the PA layer transmitter 900 are used for a first lane (or referred to as lane 0). The data scrambler 917 and lane mapping module 919 of the PA layer transmitter 900 are used for a second lane (or referred to as lane 1). If the two lanes are set to be active, the lane distribution module 905 distributes the data of the ALE frames over the two lanes. The data scramblers 907, 917 perform data scrambling for the respective lanes, for example, by scrambling operations derived from the UniPro specification (e.g., version 2.0) or other similar or appropriate scrambling operations. The lane mapping modules 909, 919 perform logical-to-physical lane mapping for the respective lanes.

As compared to an implementation of a PA layer transmitter for the conventional UniPro (e.g., version 2.0) which requires IDLE sequence encoding on a per lane basis before scrambling is executed when scrambling is enabled, the embodiment of the PA layer transmitter 900 for the interconnection protocol skips IDLE sequence encoding. In addition, in the PA layer transmitter 900, an ordered set insertion for symbol alignment (or block alignment) is performed, for example, when lane distribution is performed by using the lane distribution module 905. Further, link-based ALE frame generation is being executed to generate ALE frames, for example, by using the ALE frame generator 903. ALE block generation, CRC calculation, and ECC generation are executed for the ALE frame generation by using the ALE frame generator 903. After lane distribution, the ALE control or data blocks of an ALE frame are scrambled, for example, by using a plurality of data scramblers for multiple lanes, such as the data scramblers 907 and 917 for two active lanes, or by using one data scrambler for only one active lane. The scrambled data are sent to the physical layer (e.g., a modified version of M-PHY) by using the lane mapping modules 909, 919 via a signaling interface compliant with the physical layer, such as a signaling interface for an advanced line encoding with a larger bus width, e.g., a bus width of 80 bits, 128 bits, 160 bits or more.

The lane distribution module 905 is capable of performing burst starting (opening) or ending (closing) in addition to performing lane distribution. The lane distribution module 905 is configured to perform ordered set insertion, for example, to start (or initiate) a burst. For burst opening control with respect to an ALE burst, at least one ordered set pattern, for example, {SKP OS+SDS OS} as illustrated above, is inserted (e.g., transmitted through all lanes) instead of a <MK0, MK1> pattern used for the conventional UniPro (e.g., version 2.0). For burst closing control with respect to the ALE burst, a control sequence, such as symbol pairs <MK2, FLR> or <MK2, mMK2> PDU used for the conventional UniPro (e.g., version 2.0) (where m is a positive integer), can be used in an end of burst sequence for burst closing operation in an implementation of the interconnection protocol. Certainly, it is noted that the implementation of closing a burst or opening a new burst is not limited to the above examples of symbols or data pattern such as MK2, FLR symbols or so on because any appropriate symbols or sequence can be adopted as long as both the transmitting side and receiving side employ the adopted symbols or data pattern consistently. Regarding closing (or ending) a burst, a "burst end" operation is performed in an embodiment. In the embodiment, a plurality of symbols indicating trailing (or called trailing symbols) is transmitted for a time interval based on a unit of data transmission for an ALE mode. Taking the above ALE frame as an example, the unit of data transmission for an ALE mode is an ALE frame so that the time interval can be set to a plurality of clock cycles corresponding to at least one or more ALE frames. The trailing symbols based on the unit of data transmission in an ALE mode, such as an ALE frame, is capable of facilitating the receiving side of the burst to have sufficient signals as clock signals used on the receiving side for handling the last ALE frame in a burst.

Regarding lane distribution, in some embodiments, the lane distribution module 905 can be implemented to distribute data of an ALE frame over one or more lanes. When multiple lanes are used or active, data of the ALE frame can be transmitted in order, starting from the first one of the lanes through the last one of the lanes lane.

Figure 12:
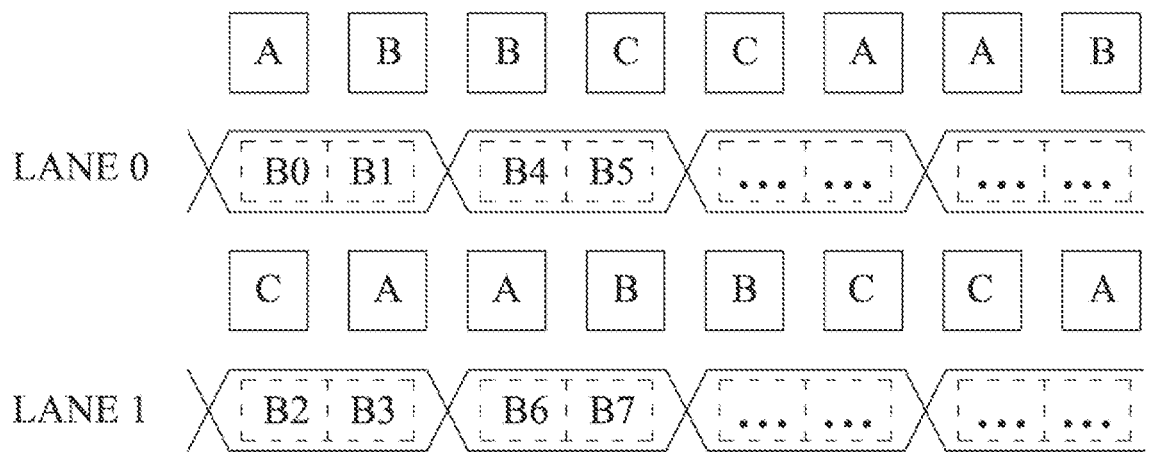
FIG. 12 is a diagram illustrating an example of PDU-based distribution.

In an embodiment for multiple active lanes, the lane distribution module 905 can be implemented to perform PDU-based distribution as described in a conventional UniPro (e.g., UniPro version 2.0), wherein a PA PDU, or two bytes (e.g., bytes B0 and B1) of an ALE frame, is distributed over an active lane such as lane 0, another PA PDU (e.g., bytes B2 and B3) is distributed over another active lane such as lane 1, and so on. In an example as shown in FIG. 12, the PDU-based distribution, however, may lead to an issue of recovery capability, wherein three-way interleaved ECCs are employed in the ALE frame generation as illustrated in FIG. 7 and two lanes are active. In FIG. 12, when burst errors occurs in the two adjacent bytes (e.g., bytes B1 and B4; or bytes B3 and B6) of PA PDUs transmitted on the same lane (e.g., lane 0 or lane 1) and associated with the same ECC engine (indicated by rectangle 'B' or 'A'), the ECC engine may not recover the burst errors since a light ECC engine has capability of one byte recovery. The above issue also occurs when the PDUs of an ALE frame are distributed over four active lanes by using the PDU-based distribution. In addition, the above issue does not occur when the PDUs of an ALE frame are distributed over three active lanes by using the PDU-based distribution.

Figure 13:
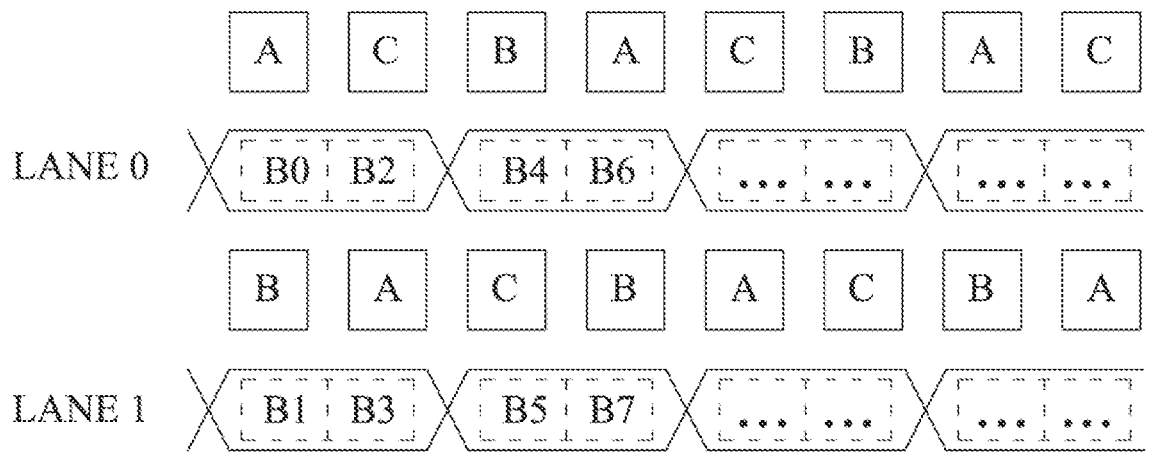
FIG. 13 is a diagram illustrating an example of byte-based distribution.

In an embodiment for multiple active lanes, the lane distribution module 905 can be implemented to perform byte-based distribution, instead of PDU-based distribution as described in a conventional UniPro (e.g., UniPro version 2.0). In an example as shown in FIG. 13, the bytes of an ALE frame are distributed over two lanes on a per byte basis such that byte B0, B1, B2, B3 and so on is distributed to lane 0 and lane 1 alternatively, wherein three-way interleaved ECCs are employed in the ALE frame generation as illustrated in FIG. 7 and two lanes are active. In this manner, every two adjacent bytes (e.g., bytes B0 and B2, bytes B2 and B4, on lane 0) on the same lane are associated with different ECC engines. Further, the above byte-based distribution also works for four active lanes. When burst errors across two adjacent bytes on the same lane occurs, the two associated ECC engines can recover the burst errors since a light ECC engine has capability of one byte recovery.

Further, in some embodiments, the PA layer transmitter 900 or the lane distribution module 905 can be implemented to employ PDU-based distribution when one or three lanes are active. In some embodiment, the PA layer transmitter 900 or the lane distribution module 905 can be implemented to employ byte-based distribution when two or four lanes are active.

In some embodiments, the controller of an electronic device (e.g., the host 10 or storage device 20) can be implemented to distribute the ALE frame on the one or more lanes of the link in one of byte-based distribution and PDU-based distribution selectively based on an active lane number. For example, the PA layer transmitter 900 or the lane distribution module 905 detects an active lane number for the sending side. If the active lane number is an odd number, the PA layer transmitter 900 or the lane distribution module 905 distributes the ALE frames to the lane(s) on a per PDU basis. If the active lane number is an even number, the PA layer transmitter 900 or the lane distribution module 905 distributes the ALE frames to the lane(s) on a per byte basis.

In an embodiment based on the PA layer transmitter 900 in FIG. 11, one or more DL frames or PACP frames are in the new forms as exemplified by the above embodiments shown in FIGS. 4A-4C and 5A-5D and received by the frame interleaving module 901. In another embodiment, the PA layer transmitter 900 can be implemented to perform mapping operations of the PA_ALE_SAP, for example, in the frame interleaving module 901, or by a frame mapping module (not shown) coupled before the frame interleaving module 901, or by the ALE frame generator 903.

Figure 14A:
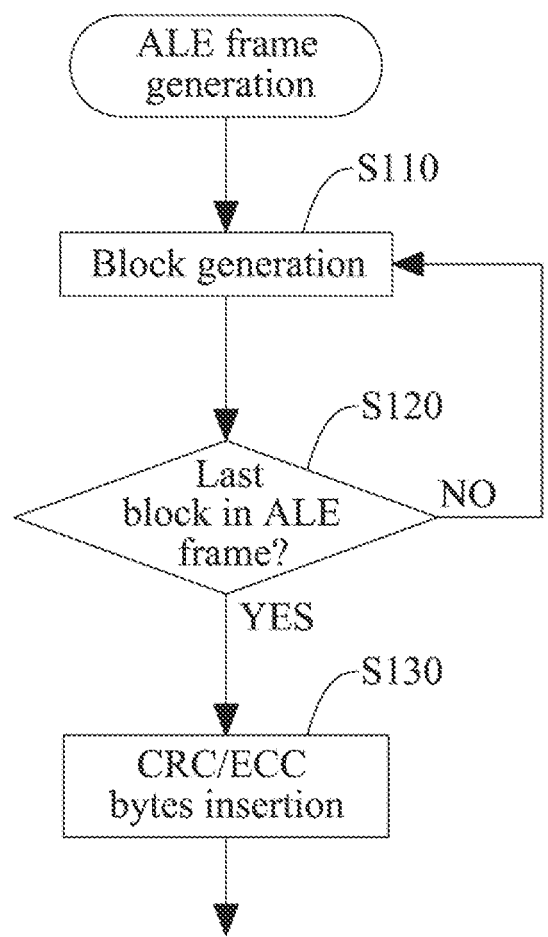
FIG. 14A is a flowchart illustrating a process for ALE frame generation according to an embodiment of the present disclosure.

FIG. 14A is a flowchart illustrating a process for ALE frame generation according to an embodiment of the present disclosure. In operation S110, an ALE block is generated. In operation S120, it is determined whether it is the last ALE block for an ALE frame. If so, operation S130 is performed; otherwise, the operation S110 is performed again for a next ALE block. In operation S130, CRC/ECC bytes insertion is performed to complete an ALE frame. For example, CRC bytes can be generated by CRC-64 calculation and ECC bytes are generated using a three-way interleaved ECC scheme. The process for ALE frame generation can be implemented by using circuitry such as logic circuits, referred to as an ALE frame generator.

Figure 14B:
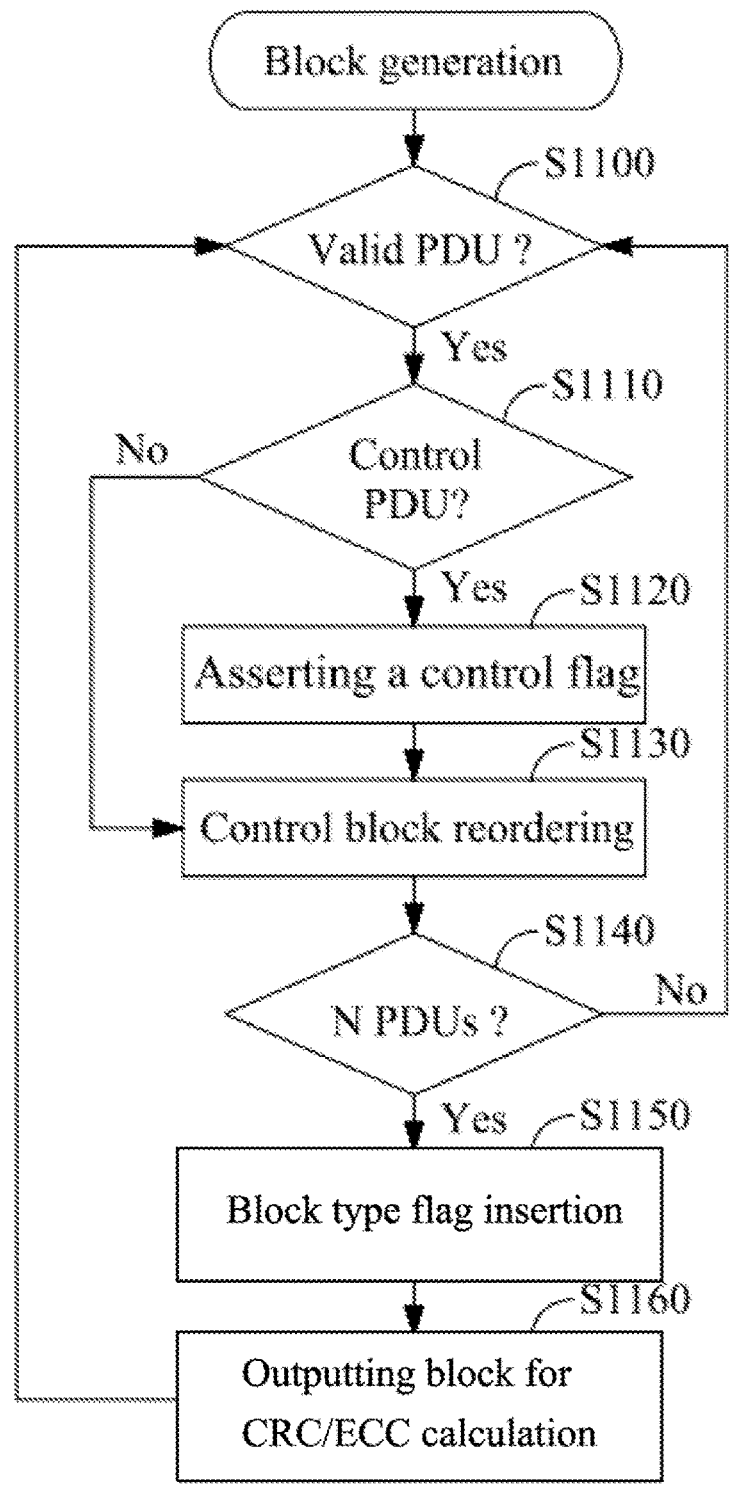
FIG. 14B is a flowchart illustrating a process for block generation according to an embodiment of the present disclosure.

FIG. 14B illustrates a flowchart of a process for block generation according to an embodiment of the present disclosure. The process of FIG. 14B can be regarded as an embodiment of the operation S110 in FIG. 14A. The process for block generation can be implemented by using circuitry, referred to as a block generator in the ALE frame generator 903. The block generator can be realized to receive one or more control PDUs or data PDUs, as exemplified by the above embodiments shown in FIGS. 4A-4C and 5A-5D, from the frame interleaving module 901 and generate one or more ALE control blocks or data blocks.

Referring to FIG. 14B, in operation S1100, it is determined whether a valid PDU is found. If so, operation S1110 is executed; otherwise, the process may wait until a valid PDU is found. For example, a previous module of the block generator, such as the frame interleaving module 901, may send a data signal indicating a PDU and a data valid signal indicating whether the PDU is valid. If the data valid signal is asserted, it indicates that the data signal indicates a valid PDU and can be received by the block generator. If the data valid signal is de-asserted, the data signal can be ignored.

In operation S1110, it is determined whether the valid PDU is a control (CTRL_INFO) PDU. If it is not a control PDU (i.e., the valid PDU is a data PDU), operation S1130 is executed. If it is a control PDU, a control flag (e.g., denoted by CTRL_Flag) is asserted in operation S1120 in order to indicate that the current ALE block requires block type flag insertion for control block, wherein it is assumed that the control flag is initially de-asserted. In addition, the POS field of the control PDU may be set based on the sequence or position of the valid PDU in a round of processing a specific number (e.g., 8) of PDUs.

In operation S1130, control block reordering is performed for the valid PDU. For example, the valid PDU is inserted in a data buffer (e.g., a register set) in order to form an ALE block where the control PDU is arranged before the data PDU (if any).

In operation S1140, it is determined whether a specific number N (e.g., N=8) of PDUs have been examined. If N PDUs are examined, operation S1150 is executed to perform block type flag insertion for an ALE control or data block having the N examined PDUs. Otherwise, the process is repeated from operation S1100 for next PDU examination. It is noted that in another implementation of the interconnection protocol, an ALE block may be configured to include N PDUs, rather than 8, such as 16, 32, as exemplified above, or other value whenever appropriate.

In operation S1150, the block type flag insertion is performed to insert a block type flag (e.g., 1) for an ALE control block when the control flag is asserted (e.g., CTRL_Flag==1) or insert a block type flag (e.g., 0) for an ALE data block when the control flag is de-asserted (e.g., CTRL_Flag==0).

In operation S1160, the ALE control or data block completed by using operation S1150 is output for CRC calculation or ECC calculation. For example, the completed ALE control or data block are output to a CRC engine for CRC calculation (e.g., CRC-64 calculation) and multi-way interleaved ECC engines for ECC calculation (e.g., 3-way interleaved ECC scheme). The process can be repeated from operation S1100 again for a next round of processing of N valid PDUs.

In an example, the control block reordering in operation S1130 can be implemented based on a piece of pseudo code of hardware description language described in TABLE 3.

TABLE 3

| Pseudo code for control block reordering | comments |
|---|---|
| MODULE ctrl_block_reordering<br>INITIALIZE tx_space AS data array of 8 words<br>// 1 word = 16 bits;<br>// if CTRL PDU -> Reorder<br>    if ( new PDU is CTRL PDU)<br>    begin<br>        if (tx_space[6] is occupied by a CTRL PDU) then<br>            insert CTRL PDU in tx_space[7];<br>        else if (tx_space[5] is occupied by a CTRL PDU) then<br>            insert CTRL PDU in tx_space[6] and shift DATA PDU;<br>        else if (tx_space[4] is occupied by a CTRL PDU) then<br>            insert CTRL PDU in tx_space[5] and shift DATA PDU;<br>        else if (tx_space[3] is occupied by a CTRL PDU) then<br>            insert CTRL PDU in tx_space[4] and shift DATA PDU;<br>        else if (tx_space[2] is occupied by a CTRL PDU) then<br>            insert CTRL PDU in tx_space[3] and shift DATA PDU;<br>        else if (tx_space[1] is occupied by a CTRL PDU) then<br>            insert CTRL PDU in tx_space[2] and shift DATA PDU;<br>        else if (tx_space[0] is occupied by a CTRL PDU) then<br>            insert CTRL PDU in tx_space[1] and shift DATA PDU;<br>        else<br>        // New PDU is the first CTRL PDU<br>            insert CTRL PDU in tx_space[0] and shift DATA PDU;<br>    end<br>    else<br>    // New PDU is DATA PDU; DATA PDU -> Store<br>    begin<br>        if (tx_space[0] is not occupied) then<br>            put DATA PDU in tx_space[0];<br>        else if (tx_space[1] is not occupied) then<br>            put DATA PDU in tx_space[1];<br>        else if (tx_space[2] is not occupied) then<br>            put DATA PDU in tx_space[2];<br>        else if (tx_space[3] is not occupied) then<br>            put DATA PDU in tx_space[3];<br>        else if (tx_space[4] is not occupied) then<br>            put DATA PDU in tx_space[4]; | If new PDU is CTRL PDU, then perform reordering.<br><br>If new PDU is DATA PDU, then storing it. |

TABLE 3-continued

| Pseudo code for control block reordering | comments |
| --- | --- |
|         else if (tx_space[5] is not occupied) then<br>           put DATA PDU in tx_space[5];<br>        else if (tx_space[6] is not occupied) then<br>           put DATA PDU in tx_space[6];<br>        else // because only tx_space[7] is available<br>           put DATA PDU in tx_space[7];<br>    end<br>end MODULE | |

The ALE frame generator 903 can be implemented to include circuitry based on the process of FIG. 14A. The ALE frame generator 903 can include a block generator based on FIG. 14B and the pseudo code for control block reordering of TABLE 3. In an embodiment, the block generator includes a logic circuit for executing a process based on FIG. 14B, a circuit module based on TABLE 3 (e.g., realizing MODULE ctrl_block_reordering), and a data buffer for providing a memory region for temporarily storing PDUs during a round of processing. For example, a data array (e.g., denoted by tx_space) of 8 words (each word of 16 bits) which can be referred to as tx_space[0] to tx_space[7] as described in TABLE 3, is used for storing 8 PDUs for an ALE block. In addition, flags or registers may also be used for indicating and checking whether an element of rx_space is valid or occupied in practice.

Taking FIG. 8C as an example, the following demonstrates how the block generator implements the control block reordering. Referring to FIG. 8C, in a round of block generation, there are 8 PDUs, for example, represented by D0, C1, D2, D3, C4, D5, C6, and D7, as an ALE block ALE_B1, sequentially input to the block generator. In the data buffer, tx_space[0] to tx_space[7] are initialized (e.g., each has the value of 0xFF) for each round of processing 8 PDUs. Firstly, the block generator receives a data PDU D0 and puts the data PDU D0 in tx_space[0] by using the circuit module based on TABLE 3. Secondly, the block generator receives a control PDU C1. Since the control PDU C1 is the second PDU and the first control PDU in this round, the block generator sets the POS field of the control PDU C1 to 1 and asserts the control flag (e.g., CTRL_Flag==1) based on the process of FIG. 14B, and puts the control PDU C1 in tx_space[0] and shifts the data PDU D0 to tx_space[1] by using the circuit module based on TABLE 3, wherein the corresponding T tag of the control PDU C1 is set to 1. After that, the block generator receives data PDU D2 and D3 and puts the data PDU D2 and D3 in tx_space[2] and tx_space[3] respectively by using the circuit module based on TABLE 3. The block generator then receives a control PDU C4, which is the second control PDU, and sets the POS field of the control PDU C4 to 4. Based on TABLE 3, since tx_space[0] has been occupied by the control PDU C1, the block generator inserts the control PDU C4 in tx_space[1] and shifts the data PDU D0, D2, and D3 to tx_space[2], tx_space[3], and tx_space[4] respectively, wherein the corresponding T tags of the control PDU C1 and C4 are set to 0 and 1 respectively. The block generator then receives a data PDU D5 and puts the data PDU D5 in tx_space[5] based on TABLE 3. Afterwards, the block generator receives a control PDU C6, which is the third control PDU in this round and sets the POS field of the control PDU C6 to 6. Based on TABLE 3, since tx_space[1] has been occupied by the control PDU C4, the block generator inserts the control PDU C6 in tx_space[2] and shifts the data PDU D0, D2, D3, and D5 to tx_space[3], tx_space[4], tx_space[5], and tx_space [6] respectively, wherein the corresponding T tags of the control PDU C4 and C6 are set to 0 and 1 respectively. The block generator then receives a data PDU D7 and puts the data PDU D7 in tx_space[7] by using the circuit module based on TABLE 3. After that, the block generator inserts a block type flag for control block, as indicated by operation S1150, to the 8 PDUs processed by the circuit module so as to complete the ALE control block. In this manner, the ALE control block CB is generated as illustrated in FIG. 8C.

Referring again to FIG. 8C, in another round of block generation, there are 8 data PDUs, for example, represented by D0, D1, D2, D3, D4, D5, D6, and D7, as another ALE block (denoted by ALE_B2), sequentially input to the block generator. The data array is initialized when this round begins. Based on TABLE 3, the data PDUs P0 to P7 will be put in tx_space[0] to tx_space[7] sequentially. After that, the block generator inserts a block type flag for data block, as indicated by operation S1150, to the 8 PDUs processed by the circuit module so as to complete an ALE data block (denoted by DB). In this manner, the ALE data block DB is generated as illustrated in FIG. 8C.

On the sending side, the ALE control or data blocks are generated as exemplified in FIG. 8C and related embodiments. The ALE frame generator 903 further generates an ALE frame by assembling a specific number (e.g., 15, 16 or so on) of ALE control or data blocks, performing CRC calculation and ECC calculation, based on the ALE frame structure as exemplified in FIG. 6A, FIG. 6B, FIG. 6C or in other example. The data of the ALE frames are then distributed to one or more lanes by the lane distribution module 905, and then scrambled and transmitted to the physical layer through the data scrambler (e.g., 907 or 917) and lane mapping module (e.g., 909 or 919). In this manner, the ALE frames can then be transmitted by using the ALE over the link to the receiving side.

Further, in some embodiments of the interconnection protocol, some control symbols and their functionality for a UniPro (e.g., UniPro version 2.0), such as filler symbols and skip symbols, can also be adopted. For example, filler symbols, for example, symbol pairs <FLR, FLR>, can be inserted in an ALE burst whenever there is no data transfer from both DL/PACP framing, as similar as those used for the conventional UniPro (e.g., version 2.0). In addition, skip symbol insertion of skip symbol pairs <MK4, MK4> in intervals not exceeding PA_TxSkipPeriod, as similar as that for the conventional UniPro (e.g., version 2.0), can be adopted in an embodiment of the interconnection protocol. Moreover, in an embodiment of the interconnection protocol, skip symbol pairs <MK4, MK4> can be mapped to control PDUs which are input to the ALE frame generator 903 to generate ALE control blocks and the ALE control blocks are to be scrambled, in contrast to the skip symbol pairs <MK4, MK4> in the conventional UniPro not to be scrambled. The mapping of the symbol pairs such as <FLR, FLR>, <MK4, MK4>, <MK2, FLR>, and <MK2, MK2> for control symbols (or control PDUs) for the interconnection protocol is illustrated in TABLE 2.

The following provides embodiments for PA layer with respect to the receiving side for the ALE. In some embodiments, the logical processing order of a PA layer receiver at the receiving side can be implemented based on an inverse of the logical processing order of the PA layer transmitter at the sending side.

Figure 15:
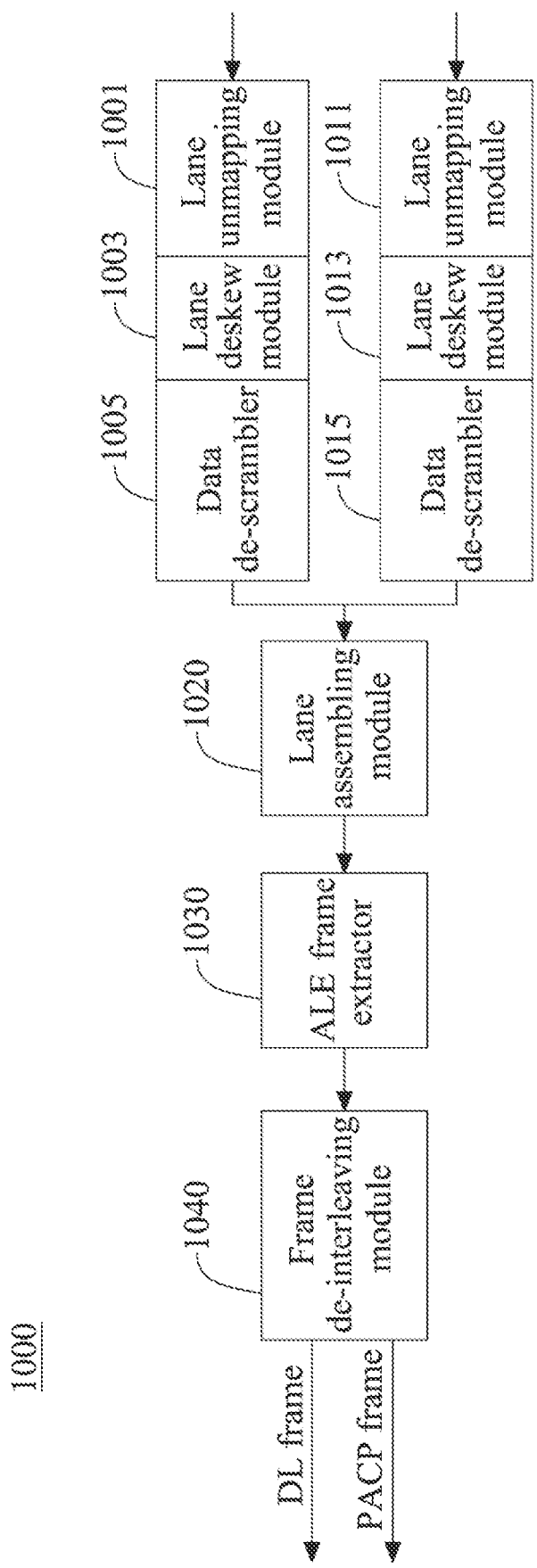
FIG. 15 is a block diagram illustrating circuit architecture applicable to the controller in FIG. 9A for a PA layer receiver for the interconnection protocol according to an embodiment of the present invention.

Referring to FIG. 15, circuit architecture applicable to the controller in FIG. 9A for a PA layer receiver for the interconnection protocol is illustrated based on an embodiment of the present invention. A PA layer receiver 1000 can be implemented based on the circuit architecture illustrated in FIG. 15 to process PHY symbols of respective lanes in order to receive corresponding ALE frames from the physical layer, e.g., a modified M-PHY, of the receiving side. In an embodiment, the PA layer receiver 1000 includes lane unmapping modules 1001, 1011, lane deskew modules 1003, 1013, data de-scramblers 1005, 1015, a lane assembling module 1020, an ALE frame extractor 1030, and a frame de-interleaving module 1040.

As compared to an implementation of the conventional UniPro (e.g., version 2.0), in an implementation of the interconnection protocol, as exemplified above for block generation, at least one ordered set pattern (e.g., {SKP OS+SDS OS}) is used to do alignment in between lanes or de-skew operation. Afterward, data de-scrambling is performed and then ALE frame extraction is performed by doing CRC64 Check/ECC error recovery and ALE block extraction to determine control or data blocks. During the ALE block extraction, the control PDU order is restored.

Since FEC buffer is required for ECC error recovery, there is no extra latency is required for ALE block extraction. It can be done on-the-fly (e.g., in one, two clock cycles or so on) after ECC error recovery.

In addition, symbol pair <MK2, FLR> or <MK2, MK2>, for example, can be used for end of burst detection for the interconnection protocol, which is used as similar as those used for the conventional UniPro (e.g., version 2.0). The skip symbol insertion can be used in the implementation of the interconnection protocol, as similar as that for the conventional UniPro (e.g., version 2.0). Thus, on the receiving side, the PA layer receiver 1000 can be configured to perform ordered set detection and skip symbol removal correspondingly.

In addition, IDLE sequence decoding is skipped in an implementation of the interconnection protocol with the ALE based on FIG. 11. In addition, in the PA layer receiver 1000, an ordered set detection is added for de-skew operation, for example, by using the lane deskew modules 1003 and 1013. Afterward, de-scrambling on data is performed to output ALE control or data blocks, for example, by using the data de-scramblers 1005 and 1015, wherein an ordered set detection can also be performed. Link-based block extraction is then performed on ALE control or data blocks to output control or data PDUs, for example, by using the ALE frame extractor 1030. During the block extraction, the control PDU order is restored.

For example, the lane unmapping module 1001, lane deskew module 1003, and data de-scrambler 1005 of the PA layer receiver 1000 are used for the first lane (or referred to as lane 0). The lane unmapping modules 1011, lane deskew module 1013, and data de-scrambler 1015 of the PA layer receiver 1000 are used for the second lane (or referred to as lane 1). The lane unmapping modules 1001, 1011 perform physical-to-logical lane mapping for the respective lanes, which is a reverse operation of what their counterparts (e.g., the lane mapping modules 909, 919) perform on the sending side. The data de-scramblers 1005, 1015 perform data de-scrambling for the respective lanes, which is a reverse operation of what their counterparts (e.g., the data scramblers 907, 917) perform on the sending side. If the two lanes are set to be active, the lane assembling module 1020 receives and assembles control or data symbols (i.e., control or data PDUs) from the two lanes. The lane assembling module 1020 performs a reverse operation of what its counterpart (e.g., the lane distribution module 905) performs on the sending side. The ALE frame extractor 1030 performs ALE frame extraction, which is a reverse operation of the ALE frame generation performed by their counterparts (e.g., the ALE frame generator 903) on the sending side. The frame de-interleaving module 1040 receives the symbols output by the ALE frame extractor 1030 and de-interleaves the symbols into respective DL frames or PACP frames.

Figure 16A:
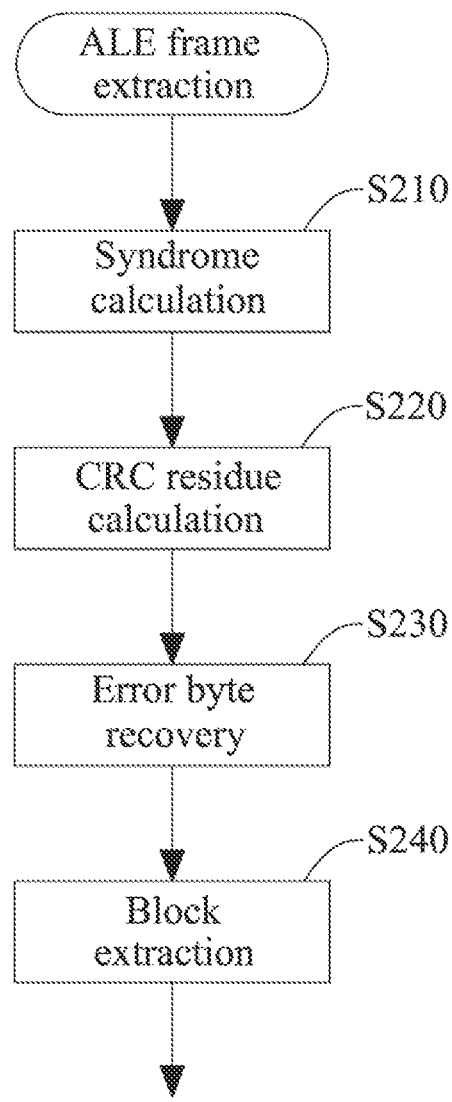
FIG. 16A is a flowchart illustrating ALE frame extraction according to an embodiment of the present disclosure.

FIG. 16A is a flowchart illustrating ALE frame extraction based on an embodiment of the present disclosure. In operation S210, syndrome calculation is performed. In operation S220, CRC residue calculation is performed, which can be CRC-64 residue calculation for example. In operation S230, error byte recovery is performed. In operation S240, block extraction is performed. The process for ALE frame extraction can be implemented by using circuitry such as circuitry based on logic circuits, referred to as an ALE frame extractor.

Figure 16B:
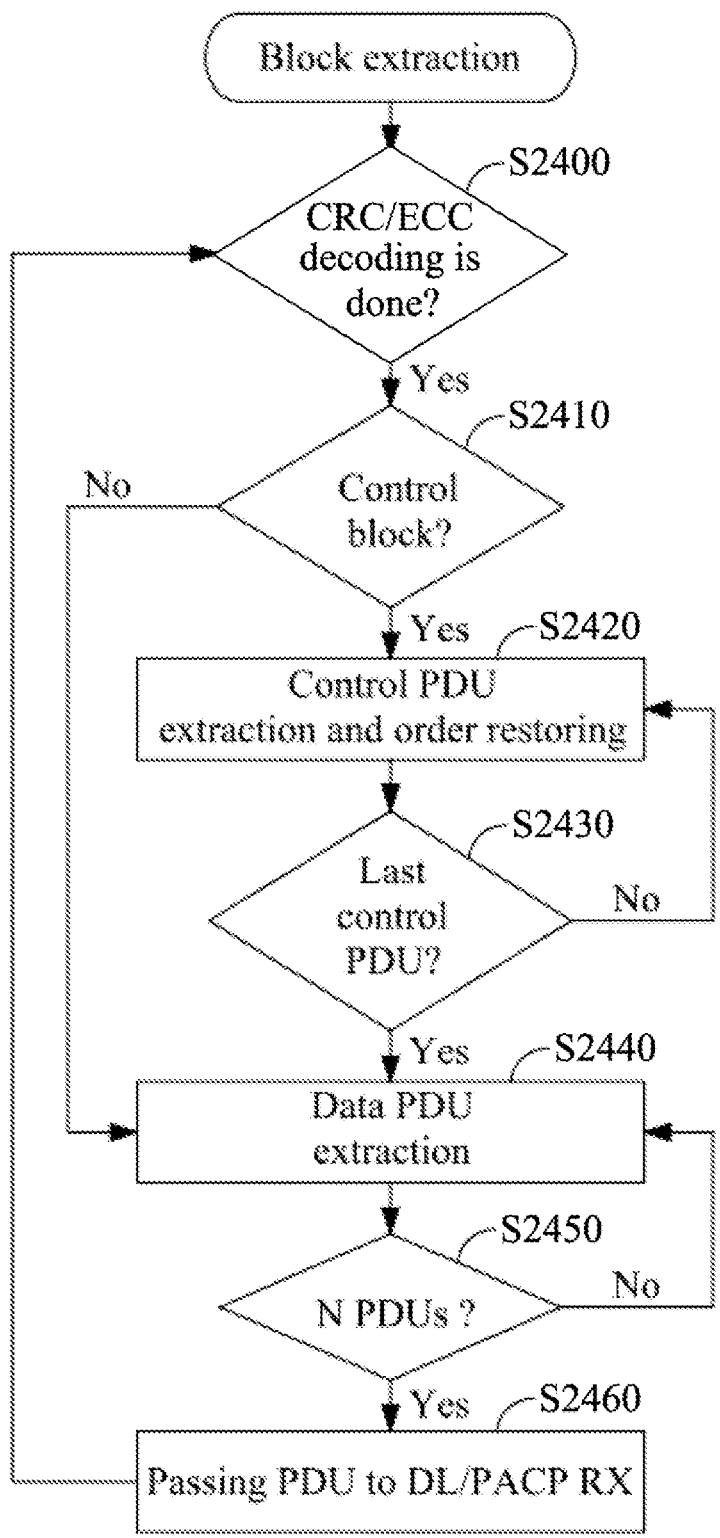
FIG. 16B is a flowchart illustrating block extraction according to an embodiment of the present disclosure.

FIG. 16B illustrates a flowchart of a process for block extraction based on an embodiment of the present disclosure. The process of FIG. 16B can be regarded as an embodiment of the operation S240 in FIG. 16A. The process for block extraction can be implemented by circuitry referred to as a block extractor in the ALE frame extractor 1030. The block extractor can be realized to receive one or more ALE control blocks or data blocks of an ALE frame from the lane assembling module 1020 and generate one or more control PDUs or data PDUs, as exemplified by the above embodiments shown in FIGS. 4A-4C and 5A-5D.

Referring to FIG. 16B, in operation S2400, it is determined whether CRC Check/ECC decoding operation is completed. If so, it will trigger ALE Block Extraction.

In operation S2410, it is determined whether a block type indicator (e.g., block type flag) indicates an ALE control block. If so, operation S2420 is executed to perform control PDU extraction and order restoring iteratively for a current PDU. If not, operation S2440 is executed to perform data PDU extraction iteratively for a current PDU.

After operation S2420, operation S2430 is performed to determine whether the current PDU is the last control PDU, for example, by checking whether the T tag of the current PDU indicates the last control PDU (e.g., if T equals 1). If it is the last control PDU (e.g., T equals 1), operation S2440 is executed to start data PDU extraction. If it is not the last control PDU (e.g., T equals 0), operation S2420 is executed again for the next control PDU until the last control PDU is processed.

In operation S2440, the data PDU extraction is performed iteratively for a data PDU. After operation S2440, operation S2450 is performed to determine whether a specific number N of PDUs (e.g., N=8) for the associated ALE block have been processed. If not, operation S2440 is repeated for a next data PDU. If a specific number N of PDUs have been processed, operation S2460 is performed to pass the processed PDUs to the subsequent stages, for example, DL receiver or PACP receiver (RX), through the frame de-interleaving module 1040.

In an example, the control PDU extraction and order restoring in operation S2420 and the data PDU extraction in operation S2440 can be implemented based on a piece of pseudo code of hardware description language described in TABLE 4.

The control PDU extraction and order restoring in operation S2420 and the data PDU extraction in operation S2440, as exemplified in TABLE 4, are substantially the reverse operations of the control block reordering, exemplified in TABLE 3. As described in TABLE 4, for a current PDU (i.e., a new PDU) which is a control PDU, the POS field (e.g., 0, 1, 2 . . . , 7) of the current PDU is examined and the current PDU is restored in a position of the data array based on the

TABLE 4

| Pseudo code for control PDU order restoring | comments |
| --- | --- |
| MODULE ctrl_PDU_order_restoring<br>    INITIALIZE rx_space as data array of 8 words<br>    // 1 word = 16 bits;<br>// if CTRL PDU -> Restore<br>    if ( new PDU is CTRL PDU)<br>    begin<br>        if (new PDU's POS == 7) then<br>            restore CTRL PDU in rx_space[7];<br>        else if (new PDU's POS == 6) then<br>            restore CTRL PDU in rx_space[6];<br>        else if (new PDU's POS == 5) then<br>            restore CTRL PDU in rx_space[5];<br>        else if (new PDU's POS == 4) then<br>            restore CTRL PDU in rx_space[4];<br>        else if (new PDU's POS == 3) then<br>            restore CTRL PDU in rx_space[3];<br>        else if (new PDU's POS == 2) then<br>            restore CTRL PDU in rx_space[2];<br>        else if (new PDU's POS == 1) then<br>            restore CTRL PDU in rx_space[1];<br>        else<br>    // new PDU's POS == 0<br>            restore CTRL PDU in rx_space[0];<br>    end<br>    else<br>// New PDU is DATA PDU -> find a rx_space and store<br>    begin<br>        if (rx_space[0] is not occupied) then<br>            put DATA PDU in rx_space[0];<br>        else if (rx_space[1] is not occupied) then<br>            put DATA PDU in rx_space[1];<br>        else if (rx_space[2] is not occupied) then<br>            put DATA PDU in rx_space[2];<br>        else if (rx_space[3] is not occupied) then<br>            put DATA PDU in rx_space[3];<br>        else if (rx_space[4] is not occupied) then<br>            put DATA PDU in rx_space[4];<br>        else if (rx_space[5] is not occupied) then<br>            put DATA PDU in rx_space[5];<br>        else if (rx_space[6] is not occupied) then<br>            put DATA PDU in rx_space[6];<br>        else // because only rx_space[7] is available<br>            put DATA PDU in rx_space[7];<br>    end<br>end MODULE | If new PDU is CTRL PDU, then perform order restoring.<br>If new PDU is DATA PDU, then store it. |

The ALE frame extractor 1030 can be implemented by circuitry based on the process of FIG. 16A. The ALE frame extractor 1030 can include a block extractor based on the process of FIG. 16B and the pseudo code for control block reordering of TABLE 4. In an embodiment, the block extractor includes a logic circuit for executing a process based on the process of FIG. 16B, a circuit module based on TABLE 4 (e.g., realizing MODULE ctrl_PDU_order_restoring), and a data buffer for providing a memory region for temporarily storing PDUs during a round of processing. For example, a data array (e.g., denoted by rx_space) of 8 words (each word of 16 bits) which can be referred to as rx_space [0] to rx_space[7] as described in TABLE 4, is used for storing 8 PDUs for an ALE block. In addition, flags or registers may also be used for recording or checking whether a rx_space is valid or occupied in practice.

value of the POS field. For example, a current PDU with its POS field equal to 7 is stored in rx_space[7] and a current PDU with its POS field equal to 6 is stored in rx_space[6] and so on. As described in TABLE 4, after the restoring of all control PDU(s) for the associated ALE block, it is to find the data array's available element which is not occupied by the restored control PDU and store a current data PDU in the available element. In an example where rx_space[1], rx_space[4], and rx_space[6] of the data array rx_space have been occupied by respective control PDUs, the available elements of the data array are rx_space[0], rx_space[2], rx_space[3], rx_space[5], and rx_space[7], a series of 5 data PDUs will be stored in these available elements (i.e., memory space) iteratively. In this example, the operations based on TABLE 4 are substantially the reverse operations of those illustrated in FIG. 8C for translating the ALE control block CB to the associated ALE block ALE_B1. On the other hand, for an ALE data block (e.g., DB), the operations based on TABLE 4 are substantially the reverse operations of those illustrated in FIG. 8C for translating the ALE data block DB to the associated ALE block ALE_B2.

In practice, the process as described in TABLE 3 or TABLE 4 can be implemented by digital circuits, such as pipelined circuits. Thus, these operations can be done on-the-fly (e.g., a clock cycle) without latency impact.

In addition, in some embodiments, the circuit architecture as illustrated in FIG. 11 or FIG. 15 can be implemented by pipelined circuits, wherein the functional circuit blocks (such as ALE frame generators, ALE frame extractor and so on) can be realized by using respective pipelined circuits electronically coupled by a data bus of a specific width (e.g., 80 bits or 160 bits and so on). The effectiveness and efficiency of the processing of the circuit based on FIG. 11 or 15 can be enhanced accordingly.

For communication of the host and the device through the interconnect protocol capable of performing an advanced line coding scheme, the ordered set pattern can be inserted, for example, before transmission of one or more ALE frames in a burst. The ordered set pattern is transmitted over the link between the host and device using the advanced line coding without being scrambled. The data pattern of the ordered set pattern is unique for receiver side detection. In the PA layer transmitter (e.g., 900 in FIG. 11), an ALE frame are transmitted to the receiver side after the ordered set pattern, wherein the ALE frame is generated based on DL frames or PACP frames and the process of FIG. 14A. When the PA layer receiver (e.g., 1000 in FIG. 15) detects the ordered set pattern, the PA layer receiver is capable of determining block boundary of an ALE frame received. The ALE frame extraction of a received ALE frame can be performed effectively and efficiently based on the process of FIG. 16A. In this manner, the implementations of the modified PA layer and modified M-PHY capable of performing the ALE are hidden from the data link layer. Accordingly, in some embodiments, the interconnection protocol with the ALE is derived from the current UFS standard, or UniPro specification, the functionality of the data link layer (or even the upper layers) based on the UniPro specification can be maintained or maintained as much as possible. Thus, the new frame structure for an advanced line encoding as proposed facilitates the implementation of the interconnection protocol with the ALE. The PHY adapter layer SAP model for ALE as illustrated in FIG. 1 or FIG. 3 and the related embodiments above facilitate the implementation of the interconnection protocol with the ALE and simplifies its implementation complexity.

Embodiments of an operation method for an electronic device are provided. The electronic device (such as a host or storage device or protocol controller, as illustrated in FIG. 9A-9C or related examples above) is operable to communicate with another electronic device. The operation method comprises the following operations. A plurality of protocol data unit (PDU) blocks is generated to be transmitted on one or more lanes of a link. An advanced line encoding (ALE) frame (e.g., ALE_F1, ALE_F2, or ALE_F3 in FIG. 6A, FIG. 6B, or FIG. 6C, or related examples above) is generated based on an ALE scheme (e.g., FIG. 14A or related examples above), wherein the ALE scheme has an effective data rate larger than an effective data rate of 8b/10b coding scheme, and the ALE frame includes the plurality of PDU blocks, an error detection portion corresponding to the plurality of PDU blocks, and an error correction portion corresponding to the plurality of PDU blocks and the error detection portion. The ALE frame is transmitted on the one or more lanes of the link to another electronic device.

Embodiments of an electronic device are provided. The electronic device (such as a host or storage device or protocol controller, as illustrated in FIG. 9A-9C or related examples above) is operable to communicate with another electronic device. The electronic device comprises a controller (such as a hardware protocol engine, host controller or device controller or the like illustrated in FIG. 9A-9C or related examples above) and an interface circuit (such as the host interface 11 or device interface 21). The controller is capable of generating a plurality of protocol data unit (PDU) blocks to be transmitted on one or more lanes of a link. The controller is further capable of generating an advanced line encoding (ALE) frame (e.g., ALE_F1, ALE_F2, or ALE_F3 in FIG. 6A, FIG. 6B, or FIG. 6C, or related examples above) based on an ALE scheme (e.g., FIG. 14A or related examples above). The ALE scheme has an effective data rate larger than an effective data rate of 8b/10b coding scheme, and the ALE frame includes the plurality of PDU blocks, an error detection portion corresponding to the plurality of PDU blocks, and an error correction portion corresponding to the plurality of PDU blocks and the error detection portion. The interface circuit is capable of transmitting the ALE frame on the one or more lanes of the link to another electronic device.

In some embodiments of the operation method or the electronic device, the plurality of PDU blocks each includes respective symbols obtained from PDUs from either a data link layer or a physical adapter layer of the electronic device (e.g., as illustrated in FIGS. 4A-4C, 5A-5D, 8A-8C, or related examples above).

In some embodiments of the operation method or the electronic device, the plurality of PDU blocks includes a control block, and a specific number (e.g., as illustrated in FIG. 8B or related examples above) of protocol data units (PDUs) are received as a PDU block to be transmitted on the one or more lanes of the link. In addition, the PDU block includes at least one PDU belonging to a control PDU category, and the control block (e.g., an ALE control block as illustrated in FIG. 8B, 8C, or related examples above) is generated based on the PDU block by reordering the PDUs of the PDU block (e.g., as illustrated in FIG. 8B, 8C, 14B, TABLE 3, or related examples above), wherein the control block includes a type indicator indicating a control block category; the PDUs of the PDU block are reordered such that in the control block, any PDU belonging to the control PDU category in the PDU block is placed before any PDU belonging to a data PDU category in the PDU block.

In some embodiments of the operation method or the electronic device, the PDU block has a PDU belonging to the control PDU category obtained by conversion of a control symbol from a data link layer of the electronic device, as illustrated in FIG. 4A, 5A, 5B, 5C or related examples above.

In some embodiments of the operation method or the electronic device, the control symbol from the data link layer of the electronic device is a data link layer control symbol based on a Unified Protocol (UniPro).

In some embodiments of the operation method or the electronic device, the PDU block has a PDU belonging to the control PDU category obtained by conversion of a control symbol of a physical adapter layer of the electronic device, as illustrated in FIG. 4B, 5D or related examples above.

In some embodiments of the operation method or the electronic device, the control symbol of the physical adapter layer of the electronic device is a physical adapter control protocol (PACP) control symbol based on a Unified Protocol (UniPro).

In some embodiments of the operation method or the electronic device, a PDU belonging to the control PDU category in the PDU block includes a position field indicating a position of the PDU in the PDU block, as illustrated in FIG. 4A, 4B, 5A-5D, 8B, 8C, or related examples above.

In some embodiments of the operation method or the electronic device, a PDU (e.g., referred to as a first control PDU) belonging to the control PDU category in the PDU block includes a link list field indicating whether there is another PDU (e.g., referred to as a second control PDU) belonging to the control PDU category in the PDU block and being placed after the PDU (e.g., the first control PDU) in the control block, as illustrated in FIG. 4A, 4B, 5A-5D, 8B, 8C, or related examples above.

In some embodiments of the operation method or the electronic device, the plurality of PDU blocks includes a data block, the controller is capable of receiving a specific number of another PDUs as another PDU block to be transmitted on the one or more lanes of the link, wherein all PDUs of the other PDU block belong to the data PDU category (e.g., as illustrated in FIG. 8A, 8C, or related examples above); the controller is capable of generating the data block based on the other PDU block, wherein the data block includes a type indicator and all PDUs of the other PDU block (e.g., as illustrated in FIG. 8A, 8C, or related examples above), and the type indicator of the data block indicates a data block category.

In some embodiments of the operation method or the electronic device, the controller is capable of transmitting at least one ordered set to the other electronic device to initiate a burst, wherein the controller transmits the control block after initiating the burst.

Moreover, in the present disclosure, "asserting" a signal (or other alternative forms such as "asserted" or "assertion") means that a signal is set to be in an active state (or an active voltage level), which may be a high or low level. "De-asserting" a signal (or other alternative forms such as "de-asserted" or "de-assertion") means that a signal is set to be in an inactive state (or an inactive voltage level), which may be a high or low level. If a signal is set to be at a low level to represent active-low, "asserting" the signal means that the signal is set to a low level, and "de-asserting" the signal means that the signal is set to a high level. If a signal is set to be at a high level to represent active-high, "asserting" a signal means that the signal is set to a high level, and "de-asserting" the signal means that the signal is set to a low level.

Moreover, in the embodiments related to the host and the storage device above, the hardware protocol engine in the host controller or the device controller can be designed based on Hardware Description Language (HDL) such as Verilog or techniques of any other design methods of digital circuits generally known to a person skilled in the art, and can be implemented by one or more of circuits based on such as a field programmable gate array (FPGA), an application-specific integrated circuit (ASIC), or a complex programmable logic device (CPLD), or be implemented by a dedicated circuit or module. The host controller or the device controller (or a processing unit or a hardware protocol engine therein) can also be based on a microcontroller, a processor, or a digital signal processor (DSP).

The present disclosure is described by using the multiple embodiments above. A person skilled in the art should understand that, these embodiments are merely for describing the present disclosure are not to be construed as limitations to the scope of the present disclosure. It should be noted that all equivalent changes, replacements and substitutions made to the embodiments are to be encompassed within the scope of the present disclosure. Therefore, the scope of protection of the present disclosure should be accorded with the broadest interpretation of the appended claims.

What is claimed is:

1. A method of an electronic device, the method comprising:
    generating, by a controller of the electronic device, a plurality of protocol data unit (PDU) blocks to be transmitted on one or more lanes of a link;
    generating, by the controller, an advanced line encoding (ALE) frame based on an ALE scheme, the ALE scheme having an effective data rate larger than an effective data rate of 8b/10b coding scheme, the ALE frame including the plurality of PDU blocks;
    wherein the ALE frame is distributed on the one or more lanes of the link in one of byte-based distribution and PDU-based distribution selectively based on an active lane number; and
    transmitting, by the electronic device, the ALE frame on the one or more lanes of the link to another electronic device.

2. The method according to claim 1, wherein the plurality of PDU blocks each includes respective symbols obtained from PDUs from either a data link layer or a physical adapter layer of the electronic device.

3. The method according to claim 1, wherein the plurality of PDU blocks includes a control block, and generating the plurality of PDU blocks to be transmitted on the one or more lanes of the link comprises:
    receiving a specific number of protocol data units (PDUs) from a data link layer or a physical adapter layer of the electronic device as a PDU block to be transmitted, wherein the PDU block includes at least one PDU belonging to a control PDU category; and
    generating the control block based on the PDU block by reordering the PDUs of the PDU block,
    wherein the control block includes a type indicator indicating a control block category, and
    wherein the PDUs of the PDU block are reordered such that in the control block, any PDU belonging to the control PDU category in the PDU block is placed before any PDU belonging to a data PDU category in the PDU block.

4. The method according to claim 3, wherein the PDU block has a PDU belonging to the control PDU category obtained by conversion of a control symbol from the data link layer of the electronic device.

5. The method according to claim 4, wherein the control symbol from the data link layer of the electronic device is a data link layer control symbol based on a Unified Protocol (UniPro).

6. The method according to claim 3, wherein the PDU block has a PDU belonging to the control PDU category obtained by conversion of a control symbol of the physical adapter layer of the electronic device.

7. The method according to claim 6, wherein the control symbol of the physical adapter layer of the electronic device is a physical adapter control protocol (PACP) control symbol based on a Unified Protocol (UniPro).

8. The method according to claim 3, wherein a PDU belonging to the control PDU category in the PDU block includes a position field indicating a position of the PDU in the PDU block.

9. The method according to claim 3, wherein a first PDU belonging to the control PDU category in the PDU block includes a link list field indicating whether there is a second PDU belonging to the control PDU category in the PDU block and being placed after the first PDU in the control block.

10. The method according to claim 3, wherein the plurality of PDU blocks further includes a data block, and generating the plurality of PDU blocks to be transmitted on the one or more lanes of the link further comprises:
receiving, by the controller, a specific number of another PDUs as another PDU block to be transmitted on the one or more lanes of the link, wherein all PDUs of the other PDU block belong to the data PDU category; and
generating, by the controller, the data block based on the other PDU block, wherein the data block includes a type indicator and all PDUs of the other PDU block, and the type indicator of the data block indicates a data block category.

11. The method according to claim 1, further comprising initiating a burst by transmitting at least one ordered set to the other electronic device, wherein the control block is transmitted after the burst is initiated.

12. The method according to claim 1, wherein the ALE frame further comprises error detection data and error correction data corresponding.

13. An electronic device comprising:
a controller configured to generate a plurality of protocol data unit (PDU) blocks to be transmitted on one or more lanes of a link, generate an advanced line encoding (ALE) frame based on an ALE scheme, and configured to distribute the ALE frame on the one or more lanes of the link in one of byte-based distribution and PDU-based distribution selectively based on an active lane number, wherein the ALE scheme has an effective data rate larger than an effective data rate of 8b/10b coding scheme, and the ALE frame includes the plurality of PDU blocks; and
an interface circuit configured to transmit the ALE frame on the one or more lanes of the link to another electronic device.

14. The electronic device according to claim 13, wherein the plurality of PDU blocks each includes respective symbols obtained from PDUs from either a data link layer or a physical adapter layer of the electronic device.

15. The electronic device according to claim 13, wherein the plurality of PDU blocks includes a control block, the controller configured to receive a specific number of protocol data units (PDUs) from a data link layer or a physical adapter layer of the electronic device as a PDU block to be transmitted, and the controller is configured to generate the control block based on the PDU block, wherein the PDU block includes at least one PDU belonging to a control PDU category; the control block includes a type indicator indicating a control block category; and the controller is configured to reorder the PDUs of the PDU block in generation of the control block such that in the control block, any PDU belonging to the control PDU category in the PDU block is placed before any PDU belonging to a data PDU category in the PDU block.

16. The electronic device according to claim 15, wherein the PDU block has a PDU belonging to the control PDU category obtained by conversion of a control symbol from the data link layer of the electronic device.

17. The electronic device according to claim 16, wherein the control symbol from the data link layer of the electronic device is a data link layer control symbol based on a Unified Protocol (UniPro).

18. The electronic device according to claim 15, wherein the PDU block has a PDU belonging to the control PDU category obtained by conversion of a control symbol of the physical adapter layer of the electronic device.

19. The electronic device according to claim 18, wherein the control symbol of the physical adapter layer of the electronic device is a physical adapter control protocol (PACP) control symbol based on a Unified Protocol (UniPro).

20. The electronic device according to claim 15, wherein a PDU belonging to the control PDU category in the PDU block includes a position field indicating a position of the PDU in the PDU block.

21. The electronic device according to claim 15, wherein a first PDU belonging to the control PDU category in the PDU block includes a link list field indicating whether there is a second PDU belonging to the control PDU category in the PDU block and being placed after the first PDU in the control block.

22. The electronic device according to claim 15, wherein the plurality of PDU blocks further includes a data block, the controller is configured to receive a specific number of another PDUs as another PDU block to be transmitted on the one or more lanes of the link, and the controller is configured to generate the data block based on the other PDU block, wherein all PDUs of the other PDU block belong to the data PDU category, the data block includes a type indicator and all PDUs of the other PDU block, and the type indicator of the data block indicates a data block category.

23. The electronic device according to claim 13, wherein the controller is configured to transmit at least one ordered set to the other electronic device to initiate a burst, wherein the controller transmits the control block after initiating the burst.

24. The electronic device according to claim 13, wherein the ALE frame further comprises error detection data and error correction data corresponding.

* * * * *